United States Patent [19]

Montgomery et al.

[11] 3,733,717

[45] May 22, 1973

[54] AUTOMATED INFORMATION TRANSMITTING APPARATUS

[75] Inventors: Harold S. Montgomery, Milwaukee, Alan F. Stevens, Oak Creek, both of Wis.

[73] Assignee: David J. Nutting and Phyllis M. Nutting, both of Milwaukee County, Wis.

[22] Filed: June 29, 1971

[21] Appl. No.: 157,836

[52] U.S. Cl. ....................................................35/9 A

[51] Int. Cl. ..............................................G09b 7/08

[58] Field of Search ..........................................35/9 A

[56] References Cited

UNITED STATES PATENTS 3,355,818 12/1967 Whitehorn..............................35/9 A

*Primary Examiner*—Wm. H. Grieb

*Attorney*—Andrus, Sceales, Starke & Sawall

[57] ABSTRACT

A shutterless film projector projects from a film with an interlock track along one frame edge, and a clock track and a pair of data tracks laterally placed along the opposite frame edge. Each film frame projects a question with a plurality of answers, selected by operation of corresponding switches. The clock track includes alternate transparent and opaque areas and the data tracks corresponding areas with appropriate transparent and opaque codes. The interlock track includes a pair of transparent areas aligned with a pair of light sensitive transistors with a film frame stopped in proper position. As the film moves, transistors serially read the data and clock tracks to actuate a pair of serial shift registers to accept the several data tracks. The first data track includes correct and incorrect answer logic, a mode determining logic, a frame address logic and next stop frame logic. This code information is interconnected through an answer input comparator and a mode decoder to a combination logic circuit to selectively actuate a "go" control for the projector, and, if desired, a multiple channel audio tape unit or the like. The second data track includes a frame number which with the particular answer selected is selectively fed to a computer.

37 Claims, 8 Drawing Figures

INVENTORS
HAROLD S. MONTGOMERY
ALAN F. STEVENS
BY
Andrus, Sceales, Starke & Sawall
Attorneys INVENTORS
HAROLD S. MONTGOMERY
ALAN F. STEVENS
BY
Andrus, Sceales, Starke & Sawall
Attorneys INVENTOR.
HAROLD S. MONTGOMERY
ALAN F. STEVENS
BY
Andrus, Sceales, Starke & Sawall
Attorneys INVENTORS
HAROLD S. MONTGOMERY
ALAN F STEVENS
BY
Andrus, Sceales, Starke & Sawall
Attorneys INVENTOR.
HAROLD S. MONTGOMERY
ALAN F STEVENS
BY
Andrus, Sceales, Starke & Sawall
Attorneys INVENTORS
HAROLD S. MONTGOMERY
ALAN F. STEVENS
BY
Andrus, Sceales, Starke & Sawall
Attorneys

AUTOMATED INFORMATION TRANSMITTING APPARATUS

BACKGROUND OF THE INVENTION

This invention relates to a means for transmitting and processing of information to and from a person and particularly to an automated instructional type device for teaching and/or collecting data.

Automated, programmed, instructional devices have recently been developed into relatively sophisticated instructional systems. In one basic form, questions are presented in sequence through the use of printed paper strips, slides, film strips and the like. The operator or student normally selects a response to a given question or other form of stimulant information by operation of a selection or response means such as a plurality of related switch units. The apparatus automatically indicates the proper or improper response selected and may manipulate the presentation means to vary the information presented in accordance with the response given. Further it is often desirable to incorporate an audible reinforcement or instruction with the visual presentation in an instructional mode and interlocking controls have been provided. For example, U.S. Pat. No. 3,355,818 discloses a film presentation system, The individual film frames are provided with a digital coded arrangement for interconnection to and control of the particular operation of the drive and, if desired, an interrelated audio unit. Each film frame includes a large code area with each function having a plurality of separately coded and read areas or bits. The co-pending application of Harold Montgomery et al. entitled "INSTRUCTION DEVICE WITH A PLURALITY OF MODES," filed on Oct. 20, 1969 and now U.S. Pat. No. 3,664,037 which issued May 23, 1972 discloses a highly satisfactory automated multiple choice question and answer presentation apparatus wherein the system can provide substantial flexibility with selection and presentation of a program with the necessary reinforcement and control in accordance with the selected responses. Although the latter structure has provided a highly satisfactory presentation system particularly for a multiple choice game or instructional type unit, there is a very significant need for a multiple choice question device which can be employed not only for instructional purposes but for gathering of information. For example, in the admission of patients and in the diagnosis of illness and the like there is often a series of more or less standard information which is required as a basic or a starting point in the admission and analysis process and the like. Such information, if properly programmed, can be automatically presented through an instructional type apparatus of the multiple choice variety and thus alleviate the necessity for the relatively expensive personal contact by an employee with the person being interrogated.

SUMMARY OF THE PRESENT INVENTION

The present invention is particularly directed to a relatively inexpensive multiple functioning information transfer and processing apparatus and particularly to such an apparatus which is adapted for interfacing with an information storage device such as a computer to store information and to provide an interrelated programmed control.

Generally, in accordance with the present invention stimulus information such as a question is transmitted to a person through an automatic programmed system. The stimulus information is carried by information carrier means such as a film, paper strip or any other medium in the form of a plurality of individual frame means which will permit sequential presentation of a programmed series of questions. Each of the questions or other information may be provided with appropriate response information, one or more of which can be automatically inserted into the system as by actuation of suitable signalling devices such as push button switch units or the like.

In accordance with a particularly novel aspect of the present invention, code carrier means having a code frame means for each stimulus frame means is driven in synchronism therewith and is preferably integrally formed with the information carrier means. In a preferred construction the information transmitting medium is a photographic film including a plurality of immediate adjacent and sequentially presented film frames. Each frame directly carries the coded information adjacent such frame to be fed into the device simultaneously with the information from the film medium. The coded system in accordance with the present invention provide a sequential binary type input which is fed into a register means as the film moves relative to a sensor means in order to store the information in accordance with the movement of the film with respect to the reading or sensor means. An interlock code means is provided to indicate if the film has moved an appropriate distance and is properly located within the projector means to ensure the proper sequential transfer of the code into the register means. Only after the interlock means indicates a proper movement can the received information be interrelated and processed from the register means. Applicant has found that the serial input of the coded information with the interconnected interlocking control provides a highly reliable and relatively inexpensive system. The code system requires a single code reader or sensor element per code channel. This substantially minimizes the initial cost of the apparatus and required input code area for providing the desired programming and interlock. The apparatus can therefore be programmed to provide a very substantial number of different modes of operation. For example, it may be desired to provide a single basic apparatus which can be automatically coded by the code on the film to provide the usual instructional system with audio reinforcement, such as disclosed in the previously referred to co-pending application of Harold Montgomery. Thus a single question may be presented with a plurality of different possible answers. Under one mode, a single audio reinforcement may be provided in response to a given selection such as a correct answer. In an alternate mode, instruction may be given for a correct answer and different instruction or comment given with respect to an incorrect answer. In still another mode, a different audio comment may be provided for each of several different possible related answers. Further it may be desired to provide a system for the accumulation of information which is transferred into the storage unit, with or without an audio interlock. In the latter system, the apparatus should permit change of the sequence of the questions in accordance with the answer given in order to provide a logical and optimum question sequence.

Applicant has found that the code system of the present invention particularly adapts the apparatus to the proper coding of the apparatus for instruction and for information gathering functions. Thus each of the frames can be separately coded to a given mode and the several modes can be intermixed in any desired order or sequence as each frame is completely coded to produce the desired function and operation within the capability of the processing and recording apparatus.

In particular, the present invention provides an information transfer or transmittal device which particularly is adapted to employing a continuous film strip driven with a synchronized sound track similar to and previously disclosed in Applicant's co-pending application. In accordance with the preferred construction of the present invention, the film projector is a shutterless film projector adapted to receive the conventional sixteen millimeter film or the like. The film is provided with an interlock track, a clock track and one or more data tracks which are laterally displaced across the film, with separate and complete code information adjacent each of the informational portions or frames of the film. Thus in a highly satisfactory practical application the several tracks were binary coded light with transmitting opaque spots or areas to selectively transmit and interfere with the transmission of light. The interlock code was provided by a pair of transmitting spots adjacent the one side or edge of the presentation frame. The clock and data tracks were formed adjacent the opposite edge of the presentation frame. The clock track included alternate transparent and opaque areas and the data tracks were provided with a corresponding number of code areas with appropriate transparent and opaque areas to insert a binary related signal to the processing apparatus. The several tracks were read by suitable light sensitive elements such as light sensitive transistors. The interlock was provided with a pair of reading elements positioned to provide a process signal with the film frame stopped in proper position within the projector such that the data track information was properly transferred into the processing equipment. As the film moved, the sensing elements read the data tracks and the clock track. The clock signals actuated a shift register for the several data tracks to successively move the information from the one end of the shift register to the opposite end, with the old information shifted out of the opposite end. Each data register was provided with a sufficient memory to contain all of the related code information in a corresponding track. Thus if the film is moved through the unit to register a new frame and the interlock indicates that the frame has been properly passed into the unit, the shift registers will be set up in accordance with the coded information related sensed data track. This information is then transferred into the processing apparatus.

In accordance with one embodiment of the present invention, a pair of data tracks were provided, one of which included a plurality of code bits providing a correct and incorrect answer logic, and a further plurality of code bits providing a mode determining signal. For example, in a multiple type question and answer information retrieval system, certain answers may indicate a particular frame sequence. Additional data is recorded as a plurality of code bits in the data track to indicate the address for the next frame to be presented in accordance with the answer received. The data track included further code bits identifying the frame as a next stop frame. This code information is interconnected through a combination logic circuit to selectively actuate a "go" control for the projector, and, if desired, a multiple channel audio tape unit or the like.

The second data track may include the frame number to interrelate the question to the particular answer recorded and thus maintain an accurate record of the information being received.

The operator maintains control of movement from a given response to a new question or information presentation and is provided with a suitable control to initiate a new presentation such as a push button switch. An enabling logic circuit is inter-connected to the answer logic and the mode decoder logic to limit operative actuation for completion of the processing of the information. Where the information is to be transferred into a computer, the switch will not be enabled until the computer is conditioned to receive the information previously established in the system or in the memory and shift register assembly.

Generally, after all of the information is properly entered into the unit, the answer or response selection unit is enabled. The operator then makes one or more selections. The total information is stored until the operator actuates a start control means to initiate a new presentation. Further, the operator is prevented from making a new selection until a proper response has been made to the then established presentation.

In the parallel clock and data track arrangement the data tracks are preferably correspondingly offset longitudinally from the clock track to ensure proper introduction and recording of the data material in response to each clock pulse.

In accordance with the particularly novel aspect of the present invention, the input and the memory is established to indicate both whether a correct answer has or has not been selected and whether an incorrect answer has or has not been selected. Thus under certain conditions it might be possible to select a correct and incorrect answer and all of this information is interrelated and correlated to permit the desired operation of the system in a great number of different modes.

As noted above the apparatus can provide for the skipping of one or more film frames. Generally this would be of particular advantage or significance when the apparatus is being employed to accumulate and obtain information regarding the operator such as might be employed in admission procedures in a hospital. Thus each question given will have a number of possible answers any one of which, obviously, will be correct depending upon the operator. The system is established to respond to and accept any answer as a correct answer. The answers are related through the correct and incorrect answer logic with the film driven to skip one or more film frames or to present the next film frame in accordance with the particular answer received.

The present invention thus provides a relatively simple and versatile apparatus for receiving and processing of information in response to stimulus information presented through any suitable means.

BRIEF DESCRIPTION OF THE DRAWINGS

The drawings presented herewith illustrate a preferred construction of the present invention in which the above advantages and features are clearly disclosed as well as others which will be readily understood from the following description of such embodiment.

In the drawings.

DESCRIPTION OF ILLUSTRATED EMBODIMENT

Figures 1, 2, 3:
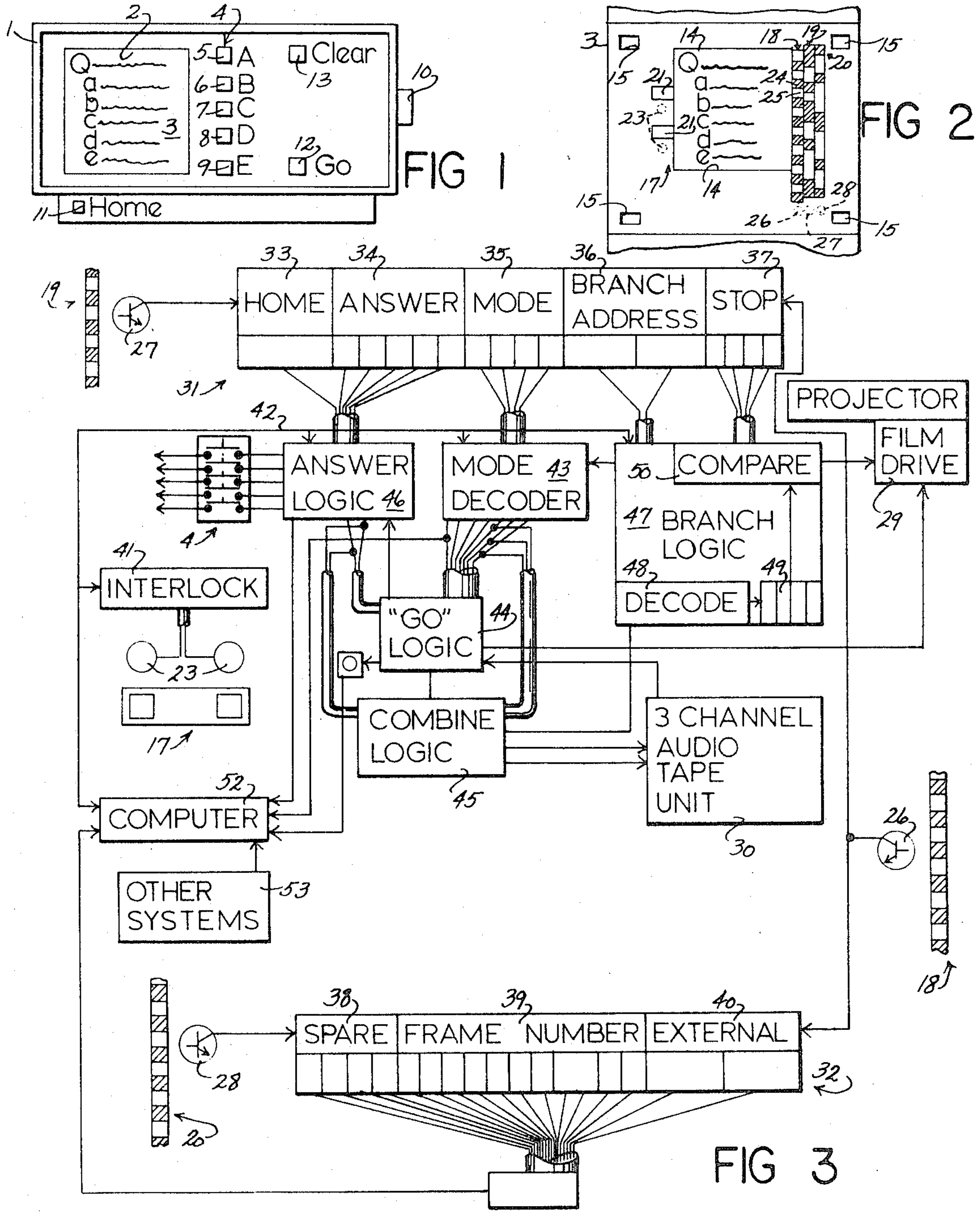
FIG. 1 is a front elevational view of an information apparatus constructed in accordance with the present invention.
FIG. 2 is a diagrammatic illustration of a film strip constructed in accordance with the present invention.
FIG. 3 is a block diagram illustrating the interconnecting logic input and processing in a preferred embodiment of the present invention.

Referring to the drawings and particularly to FIG. 1 the present invention is shown applied to an instructional apparatus having an outer housing 1 within which the various electronic and associated presentation equipment is housed. In particular the forward wall of the housing includes a presentation opening 2 within which a given information frame of a film strip 3 is located to present question and answer materials. Each question is related to one or more answers to be selected by the operator. The selection of an answer is made by actuation of one of a bank of switch buttons 4. In the illustrated embodiment of the invention, five switch buttons 5 – 9, inclusive, are related to five answers A, B, C, D and E as correspondingly presented by the presentation means. The selection of the answer actuates a memory system within the unit which had been interrelated to a particular answer to provide a desired processing. Thus, the answer whether correct or incorrect may result in actuation of the film strip or may require further actuation of the answer selections if an improper answer is given. In addition, an audio reinforcement if preferably provided and a multiple channel sound tape cartridge 10 is shown releasably inserted into the side of the apparatus. The drive for the film strip 3 and the tape cartridge 10 is interrelated to provide synchronized operation therebetween. The apparatus will normally include a home button unit or actuator 11 which will automatically drive the film strip 3 and the tape cartridge 10 to a home or starting position such that all subsequent movement is synchronized. In addition in accordance with the present invention, the operator is required to actuate the apparatus to sequentially present the information, with a particular film frame automatically selected by a coded system carried by the film strip 3. In the illustrated embodiment of the invention a "go" push button unit 12 is shown located on the front housing. Further, under certain modes the operator may be permitted to clear and reset the answer circuit and permit a different response. A separate clear means shown as push button unit 13 is shown appropriately labeled "clear" to permit the operator to clear the apparatus and maintain the previously presented question for a new response. As hereinafter described the "go" and "clear" units are illuminated to indicate to the operator that they are ready for operation. Further, the response switch units 5 are individually illuminated with different colored lights in response to actuation and the coding as to a correct or incorrect response.

The Film Strip

Referring particularly to FIG. 2, the film 3 is diagrammatically shown in greater detail and is generally a continuous strip of the conventional sixteen millimeter type or the like having a plurality of adjacent information frames 14 each of which includes a question and a plurality of possible answers. The film 3 is a more or less conventional film strip having evenly spaced sprocket drive holes or openings 15 along the immediately opposite edges of the film and with the presentation frames 14 located centrally therebetween and spaced from such sprocket holes in the illustrated embodiment of the invention. Suitable sprocket wheels, not shown for purposes of simplicity, mate with the holes 15 and continuously transport the film, from one reel to another or in an endless reel arrangement, to sequentially present and align the frames 14 within the viewing opening 2, as shown in FIG. 1. The film strip 3 is moved in any suitable or conventional manner through a suitable step drive which will provide a distinct stepped movement with each frame momentarily aligned within the viewing opening. In actual practice, the projection and drive system will be such as to move at such a rapid speed that it will appear to be a continuous movement when one or more frames is skipped. In fact, however, each frame is individually aligned with the presentation opening.

In addition to the presentation frame 14, the film strip 3 includes corresponding integral code frames provided with a plurality of interrelated coded control tracks including a position interlock track 17, a clock pulse track 18, a first data track 19 and a second data track 20. In the illustrated embodiment of the invention, the track 17 is shown immediately adjacent to the left margin of each film presentation area. This track 17 for each frame includes a pair of spaced, coded areas which in the illustrated embodiment of the invention are shown and assumed to be light transparent and transmitting square areas 21. Thus, the film material is basically an opaque light interrupting member with the developed film providing a light transmitting area in accordance with the information to be transmitted to the projector. The position of the areas 21 are read by a pair of light sensitive transistors 23 mounted to one side of the path of the film strip 3, with the film strip selectively blocking the light from the projector lamp or the like. The two light transmitting areas 21 thus provide an interrelated coded information with respect to the location of the film frames 14 and the opening 2. The dual interlock provides a method of assuring that a frame 14 has been properly transferred and positioned within the projector and further ensures proper readout of the code information carried by the data tracks 19 and 20. This is particularly significant in the present invention wherein the information is serially inserted into the system from the several data tracks 19 and 20 under the control of the clock track 18.

As shown in FIG. 2, the clock track 18 is shown immediately adjacent the righthand margin of the film presentation frame 14 and consists of a plurality of corresponding areas which are alternately light transmitting openings 24 and opaque portions 25, each portion being of a corresponding size and configuration. A single reading transistor 26 is aligned with the film track 18 in the apparatus 1 and is illuminated through any suitable convenient lamp means located to the opposite side of the film similar to the reading of the locating interlock opening areas 21. As the film strip 3 and particularly track 18 moves past the light sensitive element 26, a series of pulse signals are transmitted to the processing apparatus to provide for proper introduction of the data information carried by tracks 19 and 20.

These latter tracks 19 and 20 are similarly constructed as a series of code areas of similar size and configuration with appropriate transparent or opaque portions to provide a binary bit input through the actuation of related light sensitive elements 27 and 28, respectively, and which are aligned with the data tracks 19 and 20, respectively.

The information carried in data tracks 19 and 20 is transferred into a memory or register unit as the result of the output of the clock track as diagrammatically shown by the block diagram in FIG. 3 wherein the several signal tracks are separated and associated with their associated sensor means to provide inputs to the appropriate portions of the information processing means.

The information from the data tracks 19 and 20 are inter-related and interconnected through a logic control system to actuate a projector drive means of a shutterless projector drive 29 and an audio tape drive 30 for cartridge 10 as diagrammatically shown in block diagram in FIG. 3.

The Block Diagram

In particular, the apparatus of the illustrated embodiment as shown in FIG. 3 includes a first data register 31 associated with the data track 19 and particularly having an input connected to the sensor 27 associated with data track 19 to serially and sequentially receive the data information. A second similar register 32 is associated with the sensor 28 of data track 20 to thereby receive and retain the information received from the data track. Each of the registers is a shift register having a sequencing or clock input connected to the light sensor 26 associated with the clock track.

Thus as the film moves past the sensor 26, the shift registers are automatically actuated to transmit the information contained or established by the sensors 28 and 27 into the shift registers 31 and 32 in serial fashion. All of the information is thereby introduced into the one end of the associated register as diagrammatically shown and moves through and down the shift register to the opposite end each time a clock pulse is transmitted to the register. As the new information is introduced into the register the old information shifts out of the register automatically.

As most clearly illustrated in FIG. 2, the clock track 18 is offset from the data track by approximately one-half the individual code areas 24 and 25 to ensure that the data information has actuated the associated sensors when the clock pulses are established. This will ensure reliable and accurate transfer of information into the shift registers.

In the illustrated embodiment of the invention each of the data tracks 19 and 20 is provided with sixteen information bits which are serially transmitted into the shift registers 31 and 32, which have a corresponding number of memory units to record and maintain all of the information carried by any given corresponding track. The clock track includes eight light transparent areas and alternate eight opaque areas which are processed to give sixteen clock pulses for serially transferring the information into the shift registers.

The present invention employs a binary logic system with each code area or bit providing either of two alternate states indicated in FIG. 2 as a dark or opaque light interruption area state and a transparent or light transmission state. By combining two or more of the code areas or states various combinations can be provided to produce the desired logic control, in accordance with known binary logic. In the illustrated embodiment of the invention the data tracks and the registers are correspondingly divided to provide for interrelated bits for controlling of the operation of the system.

Further, the first data track includes a rather large transparent opening defining initial bit 33 which as hereinafter described is interconnected to ensure initial starting of the film strip 3 from a home position in synchronism with the operation of the audio track provided by audio cartridge 10. The output of the home bit unit 7 is fed into the projector control to permit reset and return of the film strip 3 and the cartridge 10 which have separate means to terminate the drive at the initial starting or home position for each.

The present invention is described with a positive logic input or code. In the binary control circuits, the level of the voltage signal varies between a given positive voltage and ground, with a binary or logic "1" related to the positive voltage signal and a binary or logic "O" related to electrical ground.

The next five bits on the data track 1 are stored in a direct answer bank 34 of the register 31. Each such register position is related to one of the 5 answers. The one area on the film 3 corresponding to the register position will be left blank to record the correct answer for example, as a related binary logic "1" signal.

The particular mode of operation is recorded in the next four binary channels or memories 35 of the shift register 31 and permit a plurality of a number of different operational modes. Thus four binary positions permit sixteen different combinations. In the construction, schematically shown in FIGS. 4–8, only seven of the possible combinations are employed, with the additional combinations being retained for any additional functions or modes which may subsequently be desired.

In addition, the data track 1 contains "branch" information to permit skIpping of one or more frames and includes a dual bit branch address memory 36 establishing a next stop frame code and a four channel stop code memory 37. Each frame carries a unique stop code for selective stopping of the film drive with a particular frame 14 aligned in the opening 2 which creates the stop code in memory 37 corresponding to a branch address stored in the system as a result of such selected stop frame address.

The shift register 32 is constructed as a sixteen bit register which serially reads from the data track 20 which includes initial unused bits 38 followed by ten bits providing a frame numbered block 39. Each frame is provided with a unique register or frame number for interrelating the presentation of the questions with the response as hereinafter described. In the illustrated embodiment of the invention the frame number is binary coded octal such that three binary bit groups are related to the ones, tens and hundreds number positions. The use of the nine bits permits the possibility of 512 different combinations and permits corresponding identification of corresponding number of frames. In addition the tenth frame in the identification number block is a conventional parity check. The the parity check ensures that the number of pulses introduced is an odd number of pulses such that the binary coded octal input has been provided.

An external control bank or block 40 of code bits complete track 20 which permits coding for actuating of external apparatus over and above the film and the audio apparatus shown. For example, it may be desired under certain conditions to actuate other reinforcing means in response to certain inputs or the like. This information can be recorded on the tape and interconnected in any suitable manner to actuate the external equipment when certain conditions are met.

In summary as the film advances through the apparatus all of the information recorded on a given frame is transferred into the registers 31 and 32 as a result of the sequential operation of the registers by the clock pulses. The pair of transistors 23 associated with the interlock track 17 and particularly the light transparent code areas 21 provide an output which is interconnected to an interlock logic unit 41 which in turn is interconnected to control the transfer and manipulation of the information in the registers and to restrict the manipulation and processing of such information to the precise location of the frame within the opening. This ensures that the code information has been transferred into the registers 31 and 32 as long as the shift register responded properly to the clock pulses and the information carried by the data tracks. The interlock unit 41 thus provides a signal to the apparatus that the film strip 3 has been positioned properly within the system for response by the operator.

Generally the output of the interlock logic circuit 41 is connected through an output line 42 to each of a plurality of interrelated logic control units.

Referring particularly to FIG. 3, the illustrated embodiment of the invention includes a mode decoder 43 which is connected to the mode selection block 35 of register 31. The mode decoder 43 decodes the binary signals and establishes control or mode signals for different types of responses to the actuation of the push button bank 4. In the illustrated embodiment of the invention, seven of the possible sixteen modes are assigned in a practical construction of the present invention. This is diagrammatically illustrated in FIG. 3 by the seven output lines which are shown interconnected to actuate or provide desired related information into a "go" logic unit 44 and a combination or combining logic unit 45. An answer logic unit 46 is connected to the correct answer data block 34 of register 31 and provides an output related to such data and the response to actuation of push button bank 4 which is also fed into the "go" logic unit 44 and the combining logic unit 45. Thus the mode decoder 43 determines the particular response of the apparatus to the answer logic and correlates the information to control the operation of the projector film drive 29 and also the audio tape drive and selection unit 30. In addition the output of the "go" logic circuit 44 is interconnected to the start or "go" push button unit 12 to selectively enable and disenable such push button unit. The combined logic unit 45 combines the answer outputs and the mode outputs to establish selective actuation of the audio tape drive unit by initiating drive of the tape and selecting the proper channel for the transmission of reinforcing information in response to the answer selected under certain modes of operation. In addition, the audio tape drive is interconnected to the enabling logic unit 44 for the "go" button switch 12 to permit presentation of the audio reinforcement or instructions.

The film drive unit 29 is responsive to the output of the "go" logic unit 44 and the actuation of the output of push button unit 12 to sequentially present the film frames or through a branch logic unit 47 which provides for the desired control branch type operation of the film drive unit 29. The branch logic unit 47 includes a branch address decoder 48 coupled to the two input branch address block 36. If the system is actuated to provide for branching or skipping of one or more film frames, this information is transferred into a storage register 49 for comparison through a suitable comparator means 50 with the information carried by the stop code data block 37 of register 31. Thus, under branching control the termination of the energization of the drive is responsive to the output of the comparator 50 which in turn is responsive to correlation between the signal in the stop code block 37 and the storage register 49. The combined functions of decoder 43 and the answer logic will determine whether or not the branch logic circuit 47 is effective and thus whether the film strip 3 is moved directly to a next sequential film frame 14 or some remote frame.

In the illustrated embodiment of the invention as hereinafter described, the branch logic circuit 47 is only employed in connection with the information retrieval system in which the particular response given may require one or more different pieces of information and the film is driven accordingly. Further, the frame number is recorded and registered in register 39 when employed in an information retrieval system. The binary information carried in the register block 39 of the data register 32 is coupled to a computer input. The output of the answer logic unit 46 is also interconnected to a computer 52 or other storage means for transferring of the information to the computer when operating in the information retrieval system or mode. As diagrammatically illustrated, the computer 52 transfer is interlocked to the output of the mode decoder to provide for transfer only under given conditions. Additionally, the "go" button 12 is interconnected into the computer assembly to transfer the information upon depression or actuation of the "go" button unit 12. The computer 52 will itself include a system ready interlock which will prevent the actual transfer until such time as the computer is available and ready to receive the information. For example, the computer may be connected to one or more additional systems 53. As a result the computer may be receiving information from another system at any given instant and the operator will have to wait until the computer is ready to receive the information from its system before it can be enabled to provide a subsequent presentation.

In summary the operation of the system, the film strip 3 and particularly each frame 14 determines the particular functional relation between the question presented and the answer selected. Each frame can thus be coded informational retrieval, question presentation with various audio reinforcement, sequential or skipped frame presentation, with or without recording of the presentation of the question and the like.

The serial recording and insertion of the data into the system during the film movement provides a very simple and reliable apparatus for introducing of the information. The dual light interlock provides a simple reliable locating and insertion control means to ensure that the proper information has been introduced and that extraneous signals have not been introduced and/or that the film is adequately aligned within the apparatus. The interlock in combination with the serial insertIon automatically compensates for any variation in drive speed and the like. The offset of the clock track 18 with respect to the data tracks 19 and 20 provides reliable entry of the data into the register by the subsequent strobed clock signals.

The apparatus can be constructed with any desired interlocking controls functioning generally in accordance with the block diagram shown in FIG. 3, or the like. Preferred schematic illustrations for the block diagram elements of FIG. 3 are shown in FIGS. 4 – 8 and described as follows.

In the particular illustrated embodiment of the invention, as shown in FIGS. 4 – 8 the mode decoder 43 establishes seven different modes of operation including an information collecting mode in which questions are presented with a plurality of responses. In this mode of operation, all answers are correct. The response and information is processed however in relationship to correct and not correct insertions and incorrect and not incorrect insertions with the resulting information controlling a branching system to provide for single advance or multiple advance within a given program. Other modes include a filler frame mode wherein a presentation is made without any response required. An exposition mode is permitted wherein there is a continuous exposition. Three different question and answer modes are provided wherein questions are presented and responses required. Under a first multiple choice question mode, the tape is actuated to provide reinforcement only if the correct answer is given. In the second mode, the tape will provide reinforcement whether a correct or incorrect answer is given but will select a different channel and comment for the incorrect answer. In the third mode of operation, the channel and reinforcement is to be determined by preselected questions or responses such as a given reinforcement given for answer B and still a different reinforcement given for answer C. Further, in this mode of operation only buttons A, B and C will be effective. Thus the responses presented in the viewing will merely make a presentation for A, B or C. D and E would be blank and operation of such buttons would be completely ineffective.

Figure 4:
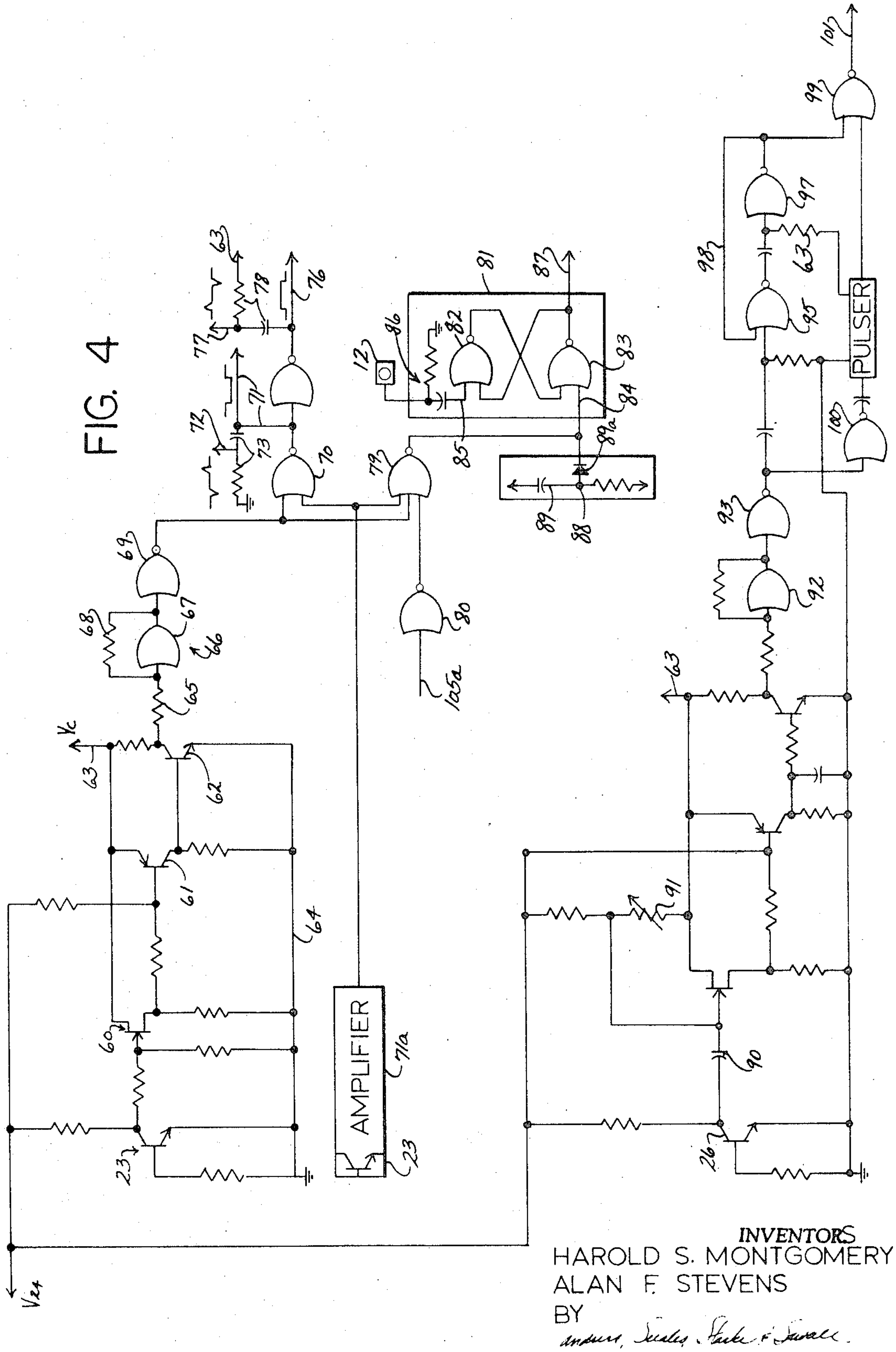
FIG. 4 is a schematic illustration of a code sensor and reader means for reading of a coded film strip.

Code Sensing Schematic – FIG. 4.

Referring particularly to FIG. 4, a preferred schematic illustration of the sensing and amplifying network for recording and responding to the information carred by the film data tracks is illustrated. In the upper portion of the drawing the interlock sensing circuit for determining the proper movement and positioning of a film frame 14 within the projector opening 2 is shown.

The light sensitive transistor 23 constitutes the input to a multiple stage amplifier driven from a 24 volt supply. The output of the transistor 23 is coupled to the emitter of a field effect transistor 60. The transistor 23 is normally biased off or in a high impedance condition causing transistor 60 to be in the off state. When the film 3 stops the transparent code area 21 illuminates the transistor 23 which conducts and drops the gate of the field effect transistor 60 to ground potential which turns on and drives a normally conducting transistor 61 off. A cascaded normally conducting transistor 62 has its input connected by transistor 61 to a logic supply 63 and thus is also cut off, thereby raising the output level of the amplifying stage to the voltage level of the positive supply voltage at line 63. The system as shown in FIGS. 4 – 8 employs a positive logic and thus the logic input will vary essentially between a common ground and a positive voltage such as five volts. Thus hereinafter logic "0" will be referred to as a ground potential and a logic "1" will relate to the positive logic voltage. The several logic "1" voltage lines in the embodiment of FIGS. 4 – 8 are identified by number 63 and the ground or logic "0" lines by number 64.

The output of the final stage transistor 62 is coupled via a resistor 65 as the input to a Schmitt trigger unit 66. The illustrated Schmitt trigger 65 includes a single input "OR" gate 67 with a positive feedback resistor 68. The output of a Schmitt trigger is connected and inverted by a logic inverter unit or gate 69 shown as a single input "NOR" gate which will provide a logic "0" signal. This signal is applied as one input of a two input "NOR" unit 70 which has a second input connected to a corresponding amplifier means 71*a* which is driven from the second interlock code sensing transistor 23 for the opposite interlock code area 21. The second amplifier means performs in the identical manner as the first and thus is shown in block diagram. When, and only when, the film frame is stationary and the two spots are aligned with the sensing transistors 23 will both of the inputs to the "NOR" gate 70 be at a logic "0." The present logic circuit includes a substantial number of "NOR" gates which may hereinafter be identified merely as a gate for simplicity of explanation. Other forms of gates are specifically identified.

The output is thus a logic "1" with the film properly located within the apparatus 1 and at a logic "0" when the film is moving. The output is thus a square wave signal appearing at line 71, as diagrammatically illustrated. The square wave output is employed to control the various functions of the circuitry. For certain circuit functions, however, a pulsed operation is required and in accordance with the illustrated embodiment of the invention, a pulse is generated at the start and terminal portion of each change in the level signal appearing at line 71. This differentiated interlock signal appears at line 72, as diagrammatically illustrated. The line 72 is connected to line 71 through a differentiating network including a series capacitor-resistor 73 to ground 74. The line 72 is connected to the junction of the series capacitor resistor 73 and produces a negative signal at the initiation of film movement and a positive pulse when the film stops to produce proper polarity to the logic circuit, where the direct current (DC) condition does not provide the desired functional operation of the logic circuitry.

In addition, the inversion or "not" condition is implied and generated through the use of an inverter 75 having its input connected to line 71. The "not" appears at line 76 and is, of course, the inverse of the signal at line 71. This signal is also differentiated and provides a corresponding phased pulse from that appearing at line 72 and at line 77 as a result of a differentiating series capacitor-resistor network 78 connected between the logic line 76 and the positive logic voltage line 63.

The several signals appearing at lines 71, 72 and 76 and 77 are interconnected to control and restrict operation of the system to proper positioning of the film 3 in the apparatus to ensure the proper transfer of the code data into the system.

The amplified output signal of the pair of interlock transistors 23 is also interconnected to control an initial homing circuit which is partially shown in FIG. 4. Thus, a three input gate 79 has a pair of inputs connected in parallel with inputs to gate 70 and a third input connected to the output of an input inverted gate 80 which has a home signal selectively applied thereto. The input to gate 80 is generated by the large last bit in the data track 19 with the data inserted in the register 31 as hereinafter described. The gate 80 then provides a logic "0" input to the third input of the three input NOR gate 79, the output of which is connected to reset a logic latch circuit 81 and terminate the film strip drive. The audio tape unit has a separate home drive control. The illustrated latch circuit 81 includes a pair of two input NOR gates 82 and 83 connected in a flip-flop configuration. Gate 83 has a reset input 84 and gate 82 has a set input 85 controlling the output at the respective gates. The set input 85 is connected generally into circuit through a differentiating network including a capacitor 86, in series with line 85, and a resistor connected to ground. The home push button switch unit 11, carried by the front of the unit as shown in FIG. 1, is connected to apply a positive input pulse to the latch 81 to set the gate and thereby establish a logic "1" at the output line 87 which is connected to the output of the gate 83. This positive output pulse signal is effective to start the film projector which continues to the home position.

The film 3 will continue to drive to the home position until the NOR gate 80 senses the positioning of the film with the relatively large home code area in the home position, at which time the gate 80 will provide a logic "0" output signal thereby tripping the NOR gate 79 when the home film frame is aligned within the presentation opening 2. Gate 79 will then provide a logic "1" input to the input 84 of gate 83 thereby triggering the flip-flop to the off or reverse position and removing the signal from line 87 to terminate the projection drive or the film drive. The tape unit will have its own homing position stop means in the form of interlocking signal on the tape, such as disclosed in the previously referred to copending application of Harold Montgomery.

The latch circuit 81 is automatically reset in the home or start condition when the apparatus is initially turned on by an automatic reset circuit signal 88. This circuit includes a pulse branch including a capacitor and resistor connected in series across the logic lines 63 – 64. A diode **89*a* is connected to the junction of the capacitor-resistor network and the gate input line 84. Thus upon initial turning on of the apparatus, a pulse signal will be applied to the line 84** thereby resetting the flip-flop circuit.

Similar latch circuits with the initial reset are employed to store signals within other parts of the present circuit and provide a corresponding control function. The latches may also be provided with an output line from the gate 82. For purposes of simplicity and clarity of explanation the circuits are hereinafter shown in block diagram and merely labeled "L." It will be understood that they can be constructed in accordance with the illustration of the latch 81 or any other suitable circuitry.

The clock sensing and data track amplifying circuits are similar to that of the interlock amplifier circuitry. An illustration of the clock tracking sensing circuit is given with the variation briefly described, as follows.

Referring particularly to FIG. 4, the clock circuitry includes the sensing transistor 26 connected as the input to a multiple stage transistor circuitry similar to that shown for the interlock circuitry. The output of the photosensitive normally conducting transistor is capacitive coupled to subsequent stages and the field effect transistor is connected to the power supply through a variable adjustable resistor 91. The amplified output is otherwise similarly applied to a Schmitt trigger 92 the output of which is also inverted by an inverter 93 to produce a series of clock pulses, varying between the logic "1" level with the logic "0" level, with each level being related to the width of the clock code area presented on the film. The output of the inverter 93 is therefore eight clock pulses per frame. This is converted into a sixteen clock pulse system through a pair of one shot circuits as the film strip moves by the sensing transistor 26. Thus, the output of the inverter 93 is connected by a differentiating network including a series capacitor-resistor 94 to the logic common or ground 64. This generates a pulse at the beginning of each level change and provides alternate positive and negative pulses which are applied to a NOR gate 95, the output of which is again differentiated through a network including a series capacitor-resistor 96 to the positive logic line 63. The further differentiated signal is applied to an inverter 97 the output of which is connected via a feedback line 98 as a second input to the gate 95. The output of the inverter 97 is also supplied to a two input NOR 99.

Figure 5:
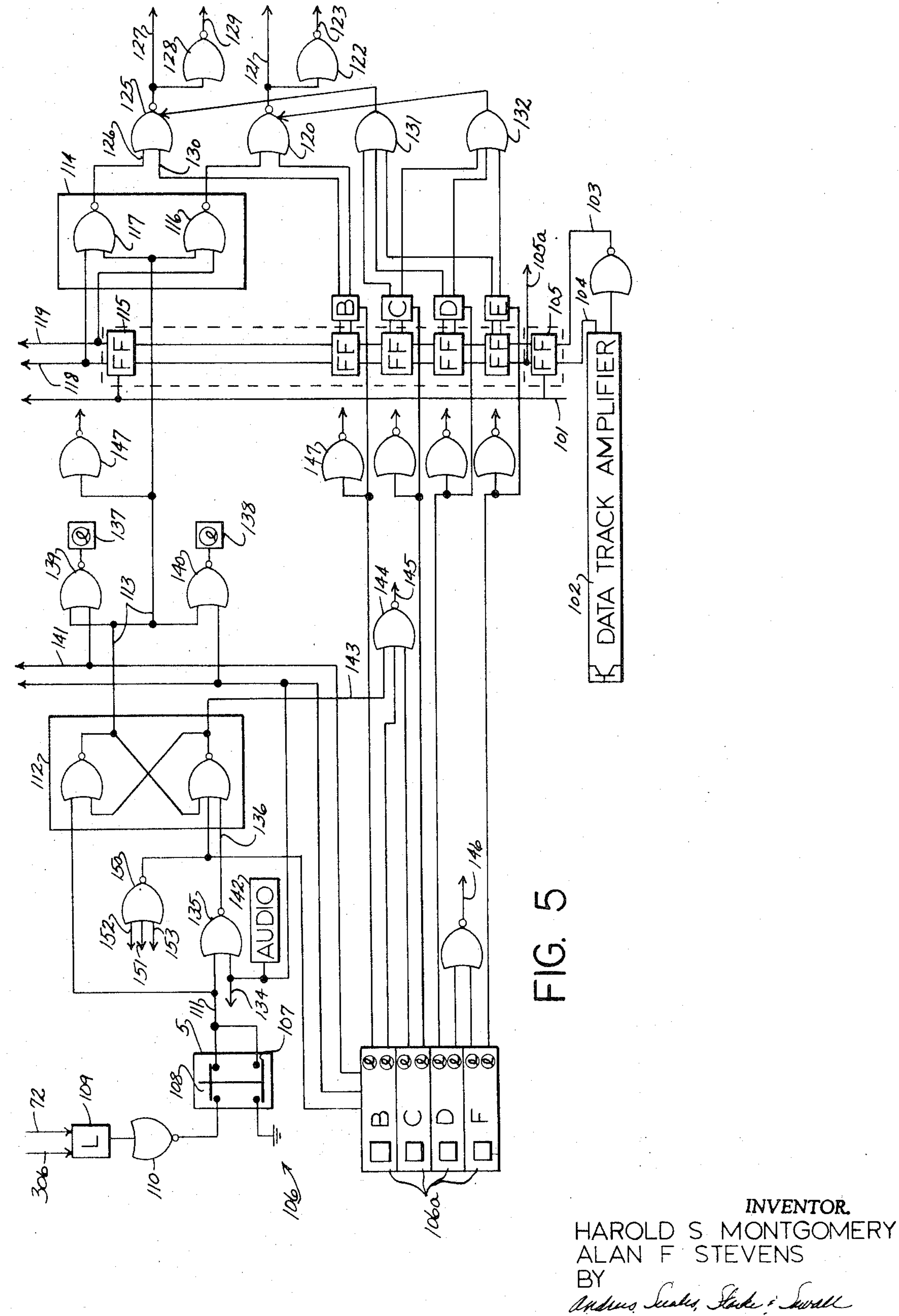
FIG. 5 is a schematic illustration of an answer logic circuit.

The other input of the two input NOR 99 is connected to the output of the clock gate 93 by a similar one shot circuit but in series with a further inverter 100 to change the input pulses to the inversion of that applied to the first one shot. The output of the gate 99 is a series of clock pulses appearing at line 101, with the eight pulses generated at the gate 93 producing sixteen corresponding related negative pulses at line 101. These clock pulses are applied to gate the shift registers 31 and 32 for transferring simultaneously the information from data tracks 19 and 20 into the respective shift registers. The data track amplifiers for tracks 19 and 20 are similarly constructed to the output of the NOR gate 93. In addition each of the data tracks produces a complement signal through the interconnection of an additional inverter to the output of the gate 93, as shown in FIG. 5. Consequently, no further detailed description of the data track amplifiers is given herein.

FIG. 5 Answer Logic Circuit

Referring particularly to FIG. 5 a portion of the shift register 31 containing the home bit 33 and the correct answer logic bits 34 is illustrated interconnected to receive the information from the data track sensor 27 associated with the information data track 19. The data track amplifier 102 has its two outputs 103 and 104 connected to the input end of the shift register 31, with the one input including the inverter for producing alternate positive and negative pulses on the two lines and as the input to the shift register.

The shift register 31 includes a series of flip-flop circuits, one for each of the related data bits or positions.

The home position 33 is a single flip-flop unit 105 which has an output 105a interconnected to the input to gate 80 of FIG. 4 to control the home stop function.

Similar flip-flops are provided for the five various answers A, B, C, D and E forming the correct answer data bank 34. The several flip-flops are interconnected to the clock pulse line 101 to provide for shifting of the information serially into the shift register memory circuits as the data track 19 passes over the sensor 27.

The flip-flop memory for the answer data bank 34 is interconnected to the answer input circuitry provided and initiated by actuation of the switch bank 4. A detailed schematic illustration of the switch circuitry associated with push button unit 5 for answer A is shown. All of the other switch buttons 6 – 9 are similarly constructed and interconnected into a response circuitry and they have been merely illustrated as properly labeled blocks 106*a* with their outputs shown interconnected into the circuitry in a manner similar to that for the detailed circuitry, for purposes of clearly explaining the functioning and embodiment of the present invention.

Referring particularly to the schematic circuit 106 of FIG. 5, the push button switch unit 5 associated with answer A is a double-pole single throw switch unit having a set of normally closed contacts 107 and a set of normally open contacts 108.

The normally open contacts 108 provide input power through an answer enabling latch 109. The reset side of the latch 109 is connected through the inverter 110 to maintain proper logic input to the normally open contacts 108. The latch 109 includes the set input connected to the interlock signal via pulsed line 72 to provide a pulsed input for the setting of the latch circuit and enabling the push button units with the film centered in the opening and the information transferred to the shift registers 31 and 32. The latch 109 is reset by the enabling of the system to move to a subsequent frame, as hereinafter described.

When the push button unit 5 is pushed, a positive logic "1" is set by the normally opened contacts 108 and transferred via line 111 to set and hold the positive logic input to a latch 112. The reset NOR gate 83 for latch 112 is a three input unit for reasons hereinafter described. The input to the latch circuit 112 will generate a logic "0" signal at line 113 connected to the set side of the latch and provides a corresponding input signal to a comparator 114 for comparing the selected answer A with the set condition of a flip-flop 115 of shift register bank 34 for answer A. The comparator 114 includes a pair of two input gates 116, 117, having one input connected in common to line 113 and the opposite inputs connected respectively one each to the two outputs of the flip-flop 115, appearing at lines 118 and 119. In the register, the line 118 associated with the corresponding side of each flip-flop is in logic "1" state and the opposite side of the side as shown connected to line 119 is in a logic "0" state whenever the flip-flop has been set to indicate that the channel corresponds to the correct answer.

Thus assuming answer A is correct, the NOR gate 117 will see a logic "1" and a logic "0" maintaining a logic "0" at its output. The NOR gate 116 however has a logic "0" in both inputs and its output switches to a logic "1." The logic signal is connected to a correct answer NOR gate 120 generating a logic "0" signal at an output line 121 which constitutes a not correct logic signal line. This output is further connected through an inverter 122 to provide a logic correct output line 123 which will now be at a logic "1" level. Thus, when the correct answer is established, a logic "1" appears at line 123 and a logic "0" at the not correct line 121. This actuation of the correct answer switches the circuit to indicate the selection of the proper answer by providing a positive output logic signal in accordance with the selected positive logic system as previously noted.

In addition the output of the comparator 114 is connected to establish and maintain a separate indication of the selection or failure to select an incorrect answer. Thus, a NOR gate 125 has an input 126 connected to the output side of the NOR gate 117. In the assumed condition, the output of the NOR gate 117 remains at zero and the output of the NOR gate 125 will remain at a logic "1" at the output line 127, indicating that a not incorrect answer has been selected. The output line 127 is connected through an inverter 128 to produce an incorrect answer selected signal line 129. If answer A had been incorrect, the output of the flip-flop 115 would be in an opposite state and line 118 would have been at a zero level. Selection of answer A would then have actuated NOR gate 117 to produce a logic "1" output. This would have switched the NOR gate 125 to a logic "0" level the inverter 128 converting the logic "0" to a positive logic "1" at line 129 thereby indicating an incorrect selection.

The NOR gate 130 is provided with a second input connected to the answer B comparator circuit. The gate 125 has a third input similarly connected to respond to output of the comparators C, E and E answers through an OR gate 131. Thus, the setting of the data track 34 and an incorrect answer selection produces an output signal via the illustrated logic circuit to record the incorrect selection at lines 127 and 129. In the absence of the selection of an incorrect signal, the proper positive logic "1" output signal appears at the not incorrect line 127 for proper processing and comparing as hereinafter described.

The correct answer logic circuitry and particularly the NOR gate 120 similarly is provided with a second input connected to the correct answer side of the answer B comparator and through an OR gate 132 to the correct answer side of the correct answer C, D and E.

The four outputs 121, 123, 127 and 129 continuously provide a correct indication of the selection of the answers with the processing being controlled not only by the selection of an incorrect or correct answer but a condition where both a correct and an incorrect answer had been selected.

In the illustrated embodiment of the invention, latches 112 associated with the insertion of a correct answer are automatically reset upon release of a push button unit of bank 4 which inserts an incorrect answer. A feedback line 134 provides a corresponding signal to a NOR gate 135, the opposite side of which is connected to the push button switch unit 5. The line 134 is connected to a combination logic circuit, as hereinafter described, to establish a normal logic "1" signal. Assuming an incorrect answer is selected, the logic combination circuit will establish a logic "0" signal which is applied to the gate 135. When the push button unit 5 is released, the contacts 107 close. These contacts are connected to logic "0" or ground and thus apply a logic "0" to the second input of gate 135. The output of the gate 135 thus rises to a logic "1" level which is set into the reset side of the latch 112 via the input 136. When the latch is reset, the logic line 113 rises to a logic "1".

The answer signal at line 113 is also connected to drive a pair of lamps 137 and 138 associated respectively with the correct answer and the incorrect answer. The lamp drivers are connected to the line 113 through respective NOR gates 139 and 140. The correct answer gate 139 has its second input connected to an interlock line 141 which responds to a combination logic mode and responses to permit energization of the correct answer lamp 137 when the device is in the formation retrieval mode or when it is in an answer mode and a correct answer has been selected and a not incorrect answer.

The incorrect answer gate 140 has its second input connected to line 134. If an incorrect signal is selected, the line 134 is in a logic "1" state and holds the NOR gate 140 off. If an incorrect answer has been selected and the push button unit 5 is still being held down, the incorrect answer lamp 138 is on. However, the resetting of the latch circuit will provide a logic "1" input to the gate 140 from the latch thereby resetting the gate 140 and extinguishing the lamp 138 upon switch release.

Lamps 137 and 138 are shown in block diagram with an input signal and a lamp is diagrammatically shown with the block. In practice the input signal may drive a transistor amplifier with the lamp connected in the output stage. As the particular form of interconnection of the driving of the lamp has no part in the present invention such detail has not been shown herein.

An audio signal generator 142 such as a buzzer may also be connected to the incorrect signal line 134 to provide an audio signal when an incorrect signal has been selected.

If an incorrect answer has been selected the operator will thus be given a momentary visual signal by the lamp 138 and may be given an audio signal.

In addition, the circuit of FIG. 5 provides a signal that at least one answer has been selected. Thus the reset side of the latch 112 is connected via a line 143 as one input to a three input NOR gate 144. This NOR gate has its other two inputs connected to the corresponding side of the answer B and answer C logic circuitry 107. The three signals will normally be at a zero level in the absence of an answer selection. The output at line 145 is therefore normally a logic "1" indicating that an answer A, B or C has not been selected.

When any one of the push buttons 5, 6 or 7 is actuated the corresponding latch 112 is actuated to establish a logic "1" at the output line 143 and a logic "0" at the output line 145 of gate 144, or if push button 8 or 9 is actuated at line 146 of gate 146*a*. This provides an input signal for determining that an answer has been selected.

In addition whenever the particular answer is selected, a positive output signal is provided to indicate the selection through an interconnected inverter gate 147 having its input connected to line 113. Thus each of the output lines from the corresponding answer selection block 107 provides a corresponding answer selected circuit with corresponding interconnection with the processing and logic control.

Further, as previously discussed in connection with an information retrieval system where there is a desire to select and obtain information for subsequent interconnection to be transferred into the computer, there is really no correct or incorrect answer. Further it is desirable to permit the operator to clear the apparatus and select a different answer if so desired from that previously selected. This is provided by an OR gate 150 connected to reset the latches 112. Gate 150 has three inputs 151, 152 and 153. The output of the OR gate is connected to the third input of the three input NOR gate of the latch circuit 112. The one clear input 151 is associated with the clear button through the combination logic circuitry hereinafter described to permit a manual clearing of the answers in response to actuation of the clear button unit 13, shown in FIG. 1, when in an information retrieval position. The second input 152 provides for an automatic reset upon initiation or turning on of power to the system and the third input 153 is connected to the interlock signal line 72 of FIG. 4 for automatic resetting of the circuitry upon transfer to a subsequent film frame.

Thus the answer logic board as shown in FIG. 5 carries all of the answer selection circuitry as well as additional interconnected logic control signals for processing of the coded information in relationship to a selected response.

Figure 6:
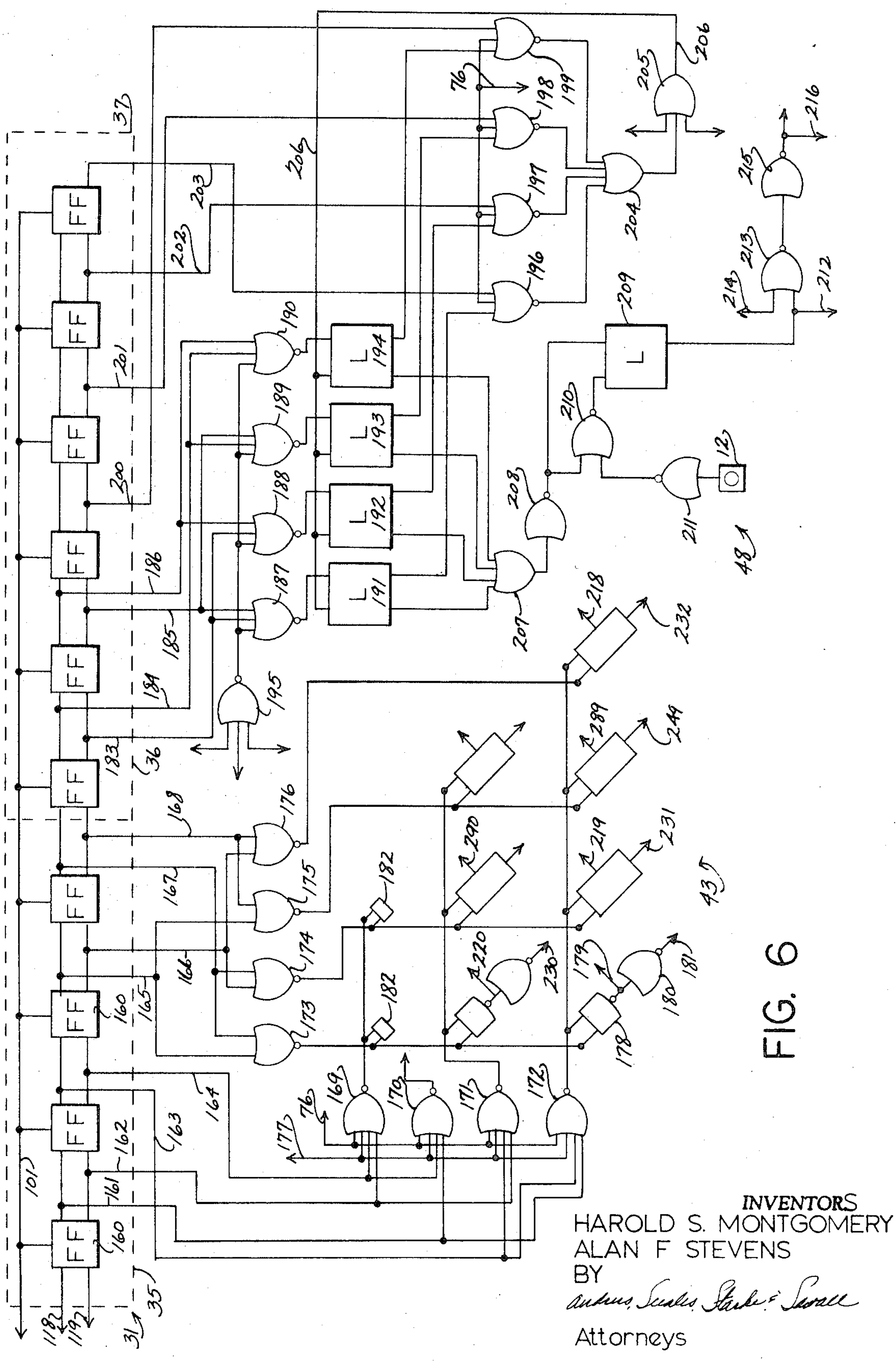
FIG. 6 is a schematic illustration of mode decoder and branch logic control shown in FIG. 3.

FIG. 6 Mode Decoder and Branch Logic

In addition to the answer selected, the particular mode of operation must be determined. The mode selection circuit is shown in FIG. 6 and particularly in the left portion of FIG. 6 where the input lines 118 and 119 from the last stage of the shift register portion shown in FIG. 5 constitute the input to the mode selection data bank or portion 35 of the shift register 31.

As shown in FIG. 6, the shift register bank 35 includes four flip-flops one for each of the mode code position. As previously noted, the mode is coded in four bits providing a binary combination for sixteen different possible modes of operation, only seven of which are employed in the present embodiment of the invention.

The binary output signals appear to the output side of each of the individual flip-flops 160 and the respective true and complement signals are generated at the output lines 161 and 162, 163 and 164, 165 and 166 and 167 and 168 respectively. The eight binary signals are connected to a decoding matrix network with the inputs 161–164 inclusive providing the horizontal inputs and the binary inputs 165 – 168 providing the vertical inputs, with the intersecting lines constituting the decoded mode points.

The several outputs of the mode flip-flop circuits are interconnected into the decoding matrix circuit through NOR gates having an output connected one each to each of the input lines of the matrix. Thus, the horizontal matrix lines are interconnected to the output lines 161–164 through the NOR gates 169, 170, 171 and 172 respectively. Similarly the lines 165 through 168 are connected into the vertical lines through the NOR gates 173 – 176 inclusive. The latter gates are shown as two input NOR gates providing for the various decoding of the four inputs into the desired binary combination.

The gates 169 – 172 are each shown as a four input NOR gate providing for the desired binary decoding of the signals at lines 161 through 164 and further providing for two interlocking inputs to each of the NOR gates. In particular an interlock signal is connected via the not interlock line 76. Thus the output at line 76 is a logic "1" during the time the film is moving and it will hold each of the NOR gates 169 and 172 in the off condition or a logic "0" condition until such time as the film terminates its movement and the logic output signal at line 76 drops to logic "0." At that time the NOR gates 169 – 172 can all be set in a logic "0" condition.

In addition, a branching input signal is applied via a line 177 to provide an interlocking signal and to prevent actuation of the mode decoder during the branching operation. Thus, a branch line 177 normally is at a logic "0" except when a branch signal has been supplied from the branch logic unit 48 indicating that the film shall be advanced by passing selected frames until a given address is received. Thus, the branch line 177 effectively disables the mode decoder 43 during the branching operation and ensures that the desired frame will be presented in response to the next actuation of the "go" button unit.

The outputs of the gates 169 – 172 are interconnected at the intersecting matrix lines to the gates 173 – 176 through decoding logic units, one of which is shown in detail and described interconnecting the outputs of the gates 172 and 173. In the particular illustrated embodiment of the invention, this is related to the informational retrieval or collecting mode. Generally, each of the decoding logic units is similarly constructed and consequently only the one is described in detail. Generally the decoding unit includes a two input NAND gate 178 having the inputs connected respectively to the horizontal and vertical lines at the point of intersection and in the particular unit selected connected respectively to the lines from the gates 172 and 173, respectively. The output of the NAND gate 178 provides a mode retrieval information signal at a line 179 which is connected to provide a corresponding logic signal. The output is also connected to an inverter gate 180 to provide a corresponding information retrieval mode signal at a line 181. Thus both the selection of the signal and the inverse of the signal are recorded at respective lines 179 and 181.

The other units for the several other modes are similarly connected at other junction points to provide corresponding functional control. As previously noted seven of the possible sixteen combinations are employed in the illustrated embodiment of the invention with the other junction points available for subsequent interconnection of additional modes of operation if so desired. Generally they will be provided with similar logic circuits shown in block diagrams 182 at two of the non-selected junctions. The other junctions will of course be provided with similar interlocks or decoding units which have not been shown for purposes of simplicity and clarity of explanation.

Figure 7:
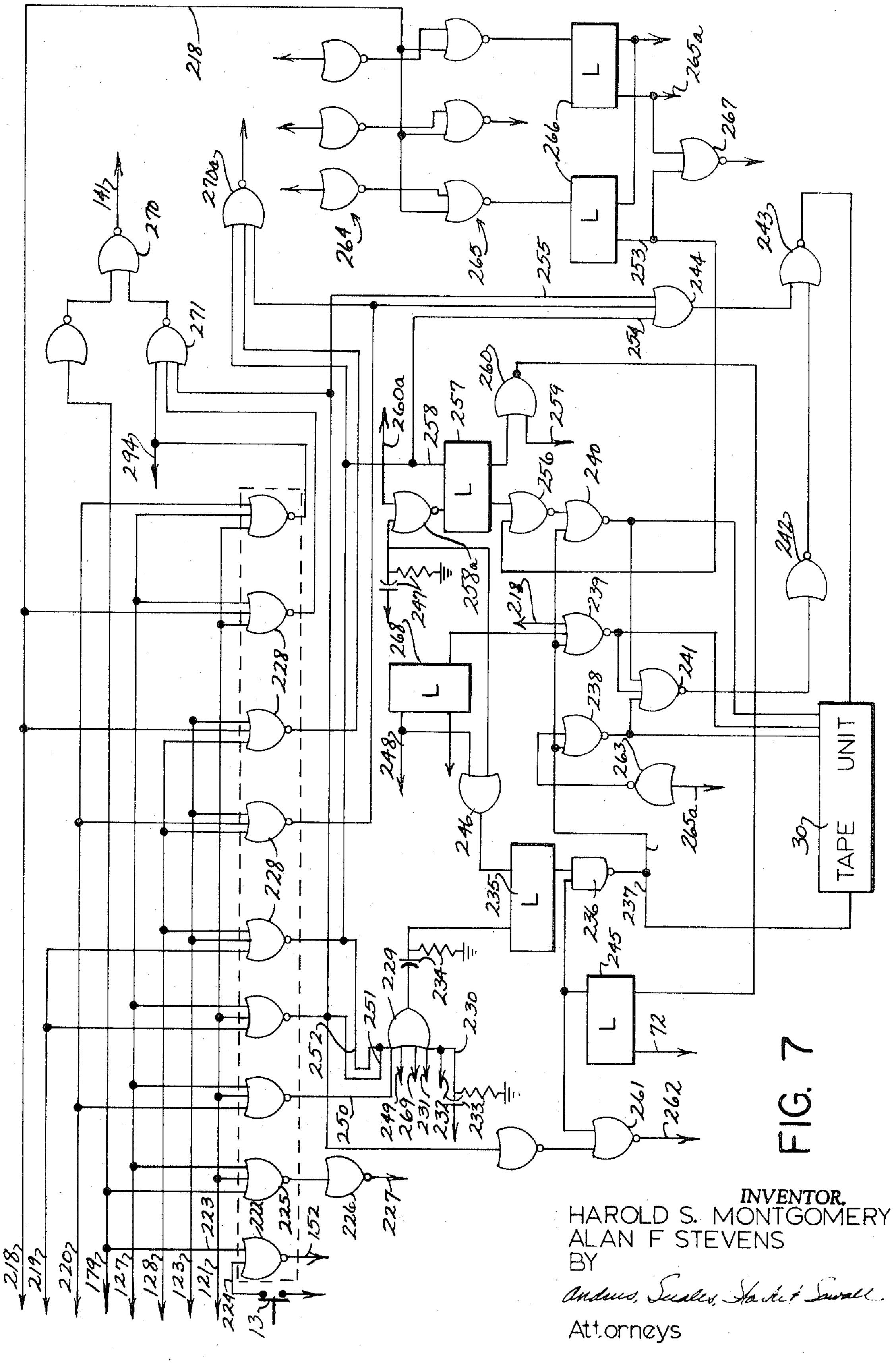
FIG. 7 is a schematic illustration of a combine logic circuit for generating control signal based on said mode and answer information.

The mode output provides a basic output signal to the interrelated control circuitry and is particularly combined with the answer logic circuitry on a separate combination logic circuit, such as shown in FIG. 7.

In addition when the information retrieval mode signal is selected and a logic "1" is presented at lines 81 the branching control circuit 48 which is also shown in FIG. 6 is activated.

Generally the circuit 48 is connected to the shift register banks 36 and 37 which are serially connected to the output of the bank 35 as shown in FIG. 6 to receive the data information in sequence as a result of the clock pulsing via line 101.

Bank 36 includes a pair of flip-flops providing the branch start information at the respective output lines 183 and 184 for the first flip-flop and the output lines 185 and 186 for the second flip-flop. The four lines are interconnected as the inputs for three input NOR gates 187, 188, 189 and 190 to provide a binary coded output member in accordance with the address signal inserted in bank 36 via the data track 19. The output of the last NOR gates respectively provide an input set signal to latch circuits 191, 192, 193 and 194, each of which are generally constructed in accordance with the illustrated latch circuit previously described and include a pulsing network to provide a pulsed actuation in response to the output of the NOR gates. The gates 187 through 190 as noted are three input NORS two inputs of each being connected to two lines 183 through 186 inclusive. The third input is connected to a common control line 195, which receives a signal related to enabling of the mode selected line 181, the correct answer selection line 123 and the not incorrect answer line 127 as combined by logic circuitry shown in FIG. 7. This, in essence, incorporates the incorrect answer logic concept into the branching network to provide branching in response to certain responses but to prevent branching in connection with all other responses in the information retrieval mode.

Thus only when the proper combination of answers have been selected and the device is set in an information retrieval mode will a logic "0" appear at the line 195, thereby producing the necessary conditioning of the gates 187 and 190 for transfer for the stop address into the latch units 191 through 194. Once established, the latch circuits will be maintained until reset as the result of a comparison with a new film frame, as follows.

Thus the outputs of the several latch circuits 191 – 194 are connected into a comparator bank including four three input NOR circuits 196 through 199. One of the inputs for each of the NOR circuits is connected to one of the latch circuits. Thus the NOR gate 196 has one input connected to the output of the latch 191. The NOR gate 197 has one input connected to the output of the latch 192, etc. A second input of the respective NOR circuits 196 and 199 is connected to one of the outputs of the address decoder bank 37 of the shift register 31. The data bank 37 includes four flip-flop units, one for each binary bit. The complement of the true signal are connected as the second input signal to the comparator bank. Thus the output of the data bank 37 appears at lines 200 through 203, inclusive and these lines are connected respectively as a single input to each of the NOR gates 196 through 199. In addition, the comparator bank has a common third input connected in common to each gate 196 – 199 and to the interlock signal line 77 taken from the interlock reader shown in FIG. 4. The signal line 77 is a pulse signal which is generated when the film movement stops. The positive pulse when the film starts does not enable gates 196 – 199. When the film stops, line 77 produces a negative pulse and enables the gates to compare the stored signal with the bank 37. The output of the comparator stage is interconnected in common to a first OR gate 204 which is connected to a second OR gate 205, the output of which appears at a reset line 206 connected in common to the reset side of the latch circuits 191, 192, 193 and 194. The OR gate 205 is similarly constructed as the OR gate 150 of the answer logic circuit and includes a similar clear button reset line 152 and a programmed reset line 1 3 which is connected into a combination logic circuit for clearing of the unit when power is initially applied.

Thus new address in bank 37 is introduced into the register for comparison with each subsequent film upon actuation of the "go" button.

Simultaneously, the actuation of the "go" button is operative to establish a branch drive control. Thus the output of the several latch circuits 191, 192, 193 and 194 are connected to an OR gate 207 the output of which is inverted through an inverter 208 and applied to a latch circuit 209. A logic "1" from any of the latch circuits generates a logic "1" input to the inverter which establishes a logic "0" to the branch latch circuit, and thereby conditioning the latch circuit for resetting. The output of the gate 208 is also applied to one input of a two input NOR gate 210, the other input of which is connected to the "go" push button unit 11 through an inverter 211. When the "go" button is actuated, a logic "0" signal is applied to the inverter 211. The logic "1" from the gate 208 holds a logic "0" to the reset side of the latch circuit 209. When the branch comparison is made, the latches 191 – 194 reset and establish a logic "0" to gate 210 which resets the latch 209 and generates a logic "0" output at line 212 of the latch circuit. The output line 212 provides a branch signal into the logic circuit to condition the circuit for branching and driving of the film until the programmed film stop code corresponds to the programmed film branch address.

The output line 212 is also applied to the two input NOR 213, the other input line 214 which is connected to the homing contact or signal such that the output of the gate 213 is a not branch or home signal. This signal also generates a complement thereof through the inverter 215, the output of which appears at line 216 as a branch or home signal. The signal is applied to the mode decoder line 177 to disable the decoder during branching and homing. Thus if the system is in the information collecting mode and a proper input has been provided, actuation of the "go" switch first provides for film transfer until such time as the branch logic circuit matches the stop address on the frame. Only then does the continuous film movement terminate.

FIG. 7, Combine Logic for Answer and Modes

The answer logic circuits generated by the circuit of FIG. 5 and the mode and branch logic signals generated by the circuit of FIG. 6 are combined and applied to a combination logic circuit or unit 45, a preferred construction of which is shown in FIG. 7.

Referring particularly to FIG. 7, four input mode lines are shown which are connected to the mode circuit of FIG. 4. In particular the illustrated input lines relate to the four modes for multiple choice input and response. In particular the line 179 connected to the not information collecting mode line 179 of FIG. 6 provides a first input with three other inputs related to a question combined with a first, second and third audio reinforcement modes of operation provided by the lines 218, 219 and 220, connected respectively to the decoder 43 of FIG. 6.

In addition to the four question mode presentations, the input to the combined logic circuit of FIG. 7 includes the answer logic circuit lines 121, 123, 127 and 129, corresponding to the complete logic answer identification as heretofore described.

The output of these eight lines are interconnected with each other and certain other logic control signals to provide the desired interaction and functional drive control in response to the combined functions.

The several signals are generally combined through a bank of NOR gates 221.

A first auxiliary two input NOR gate 222 is provided having one input connected via the line 223 to the not information collecting line 179. The opposite side of the NOR gate 222 is connected to the cancel or clear button 13 via lead 224. The output of the gate 222 appears at line 152 which is connected to the several clear input signals and particularly gate 150 of the answer logic circuit (FIG. 5) and the gate 250 of the branching circuit (FIG. 6). When the information retrieval mode has been selected, the line 179 will be at logic "0." When the clear button switch unit 13 is actuated the second input to the gate 222 will also be a logic "0," establishing a logic "1" at the line 152 and providing a resetting signal via the OR gates to the several latch circuits. This permits manual clearing of a selected answer prior to actuation of the "go" button while operating under such mode.

A second three input NOR gate 225 has its first input connected to line 179 and its second and third inputs connected respectively to lines 121 and 127 thus providing a coded output related to selection of an informational retrieval mode with the selection of an answer coded to be incorrect in absence of a selection of an answer not correct. Thus an output signal is generated only when these conditions are generated and applied to an inverter 226 the output of which appears at line 227 providing an indication of the not condition of the combination of the information collecting mode and a correct answer and a not incorrect answer. Line 227 applies the logic signal to branch logic line 195 of FIG. 6 for setting and transfer of the address of the several registers 187 through 190.

The bank of NOR gates 221 otherwise includes a series of seven similar gates interconnected to the lines 218, 219 and 220 in combination with the lines 121, 123, 127 and 128 to establish the particular mode in combination with a correct answer and a not incorrect answer or a not correct answer and an incorrect answer. The output of these NOR gates are interconnected and combined to produce predetermined functional movement of the film and the tape drive.

The output of these NOR gates along with mode selection lines are connected to an OR gate 229 for controlling the operation of the audio tape unit 30. The illustrated OR gate 229 provided with the various inputs from the mode selection units relating to the three question and audio response modes. Thus lines 230, 231 and 232 are connected to the corresponding mode decoder logic unit 43 of FIG. 5. The output signals are applied through differentiating networks 233 to provide a corresponding pulse output from the OR gate 229. The output of the OR gate is further differentiated by the network 234 to provide a set impulse to the latch circuit 235. The set output of the latch circuit is logic "1" which is in turn connected to an AND gate 236 to generate a tape control signal at the output line 237.

The tape unit operates when the line 237 is at a logic "0" signal in accordance with the selected operating drive. The output signal 237 is also applied to condition three NOR gates 238, 239 and 240 for establishing selection of one of the three channels of the tape unit. The output of the NOR gates are applied to a summating NOR gate 241 the output of which is inverted via a gate 242 and applied as one side of a two input NOR 243 the output of which provides a grounding of the audio signal to positively prevent audio output. The opposite side of the NOR gate 243 is connected through an OR logic gate 244 to terminate the audio or hold the audio off in response to certain inputs, as hereinafter described.

The audio unit drive is controlled by the interlock circuit through a latch 245 having the reset output connected as the second input to the AND gate 236. The set input of the latch circuit 245 is connected to the differentiated interlock signal at line 72 of FIG. 4. Thus when the film frame stops, the latch 245 is set to produce a logic "1" output as an input to the gate 236. When the opposite input receives a logic "1" signal from the latch 235 the AND gate 236 will produce the desired logic "0" signal to operate the tape and condition the channel selection gates 238 – 240.

The latch circuit 235 is initially reset through an OR gate 246 one input of which is connected directly to an automatic reset network 247 and the second input of which is connected to a tape generated stop signal from the audio unit via a line 248. Thus, the tape unit 30 includes a signal generating system, not shown, for generating a frequency stop signal at an appropriate point on the audio tape which is transmitted via a suitable electronic circuitry as a pulse into the stop line 248. Either this or the resetting signal is transmitted via the OR gate 246 to reset the latch 235 and produce a logic "1" thereby terminating the logic "0" at line 237 and terminating operation of the tape unit. Thus initially the system is similarly set to provide a logic "1" at line 237 holding the tape in a no run condition as a result of the input from the reset unit 247. If the mode unit provides a signal relating to a question mode, the AND gate 236 is conditioned to operate as a result of the setting of the latch 235. The tape then runs in synchronism with the film until a stop beep resets gate 235 and terminates the audio drive.

Thus selection of any one of the question modes results in initial operation of the tape unit with a resetting of the tape unit upon receipt of the stop signal.

After such selection and operation, the tape unit 30 is again selected to run under selected question modes or alternatively under an exposition mode. The OR gate 229 is provided with a series of additional inputs including an input 249 connected directly to the exposition mode line 249 of the mode decoder of FIG. 6. In addition the desired question mode lines are interconnected with the answer logic through the NOR gates 228 to provide additional triggering inputs for running of the tape unit and providing for the desired channel selection.

The tape unit is initiated by the inputs to the OR gates 229. Three of the inputs 250, 251 and 252 are derived directly from the related logic gate 228. Thus the line 250 goes to the NOR gate associated with the first question mode line 220, the correct response line 123 and the not incorrect line 128. When this combination is established a positive logic signal is applied via the line 250 to the OR gate 229, the output of which is differentiated and transmitted as a set pulse to the logic latch 235. As in the previous description, the output will then actuate the AND gate 236 to establish a run tape at line 237. The line 237 will then operate to drive the tape unit 30. Simultaneously this signal is applied to condition the three gates 238, 239 and 240 for response. Channel 1 is automatically selected for the first operating mode and with a correct answer. The first channel is automatically inserted into the system unless the NOR gates 238, 239 or 240 are actuated to transfer the signal to some other channel.

Further, audio kill OR gate 244 is actuated in response to selection of a correct answer under the first question mode through an input line 253 which is interconnected to the gate and associated with a first question mode, a not correct answer and an incorrect answer. The selection of a correct answer provides a positive one logic signal to the OR gate thereby actuating gate 243 to remove the kill circuit.

If the device is operating in a question mode with two channels of operation and thus under the control of line 219 of the mode decoder of FIG. 6, audio tape unit 30 is actuated to run in response to either a correct or an incorrect answer. Thus, the associated NOR gates 228 for the second mode are connected to line 219 and both have their outputs connected as an input to the gate as inputs 251 and 252 of the OR gate 229. Either one thus actuates the latch 235 to operate the audio unit and to enable the selection channel. The outputs are also connected as the second and third inputs to the OR gate 244 to remove the kill circuit via the lines 254 and 255.

The channel selection is made by one of the NOR gates 238 and 240.

The second channel is connected to respond to either of two conditions one of which is the second mode of operation with an incorrect answer selection. The latter incorrect mode is inserted into the unit through a latch circuit 257 having a set input connected via a lead 258 to the output of the logic NOR gate 228 of bank 221 connected to the lines 219, 123 and 128 to indicate the second question mode of operation with a not incorrect answer and an incorrect answer recorded. Latch circuit 257 is normally reset from the standard reset circuit 247, via an OR gate 257a. When a positive signal appears at line 253 latch 257 is set to enable the second channel gate 240 and the second channel of the audio tape unit 30 to transmit a message signal. The channel 2 select line from latch 257 is directly applied as input to the channel 1 gate 238 to positively prevent transmission therefrom.

The second channel includes a stop beep signal which appears at a line 259 constituting one input of a two input NOR gate 260, the other input of which is connected to the set output of the latch circuit 257. Thus, when the latch circuit 257 is set to enable channel 2, it also conditions the gate 260 to respond to the stop signal and establish a stop signal at the output line which in turn is set to reset the initial latch run circuit 245. This removes the logic "1" enabling signal from the AND gate 236 thereby terminating the running of the tape unit, as previously described.

The latch circuit 257 relating to the second question mode with an incorrect response is reset by an input signal received via the gate **258*a*.** The enabled "go"

button must establish a positive logic signal via a line 260*a*. The "go" button is not enabled at this time.

Thus, in the second mode of operation, an incorrect answer demands the tape to run and provides a message. Whtn the stop signal is obtained from the tape however the "go" system is not immediately enabled but rather the incorrect selection is recorded in a memory unit and the "go" button only enabled when the correct answer has been subsequently selected. The output of the latch circuit 257 applied to the gate 260 carries the necessary information. When the not signal is established, the positive going pulse is applied to the gate 260 and the first stop beep appears at line 259 and a positive output pulse is applied to the latch 245. The latch circuit 245 will then be set to a logic "0" state and the AND gate 236 will establish a logic "1" output inhibiting and preventing further tape motion.

Additionally, the output of the latch 245 is connected into the NOR gate 261 to provide a logic "0" signal thereto. The opposite input of this gate 261 is interconnected through an inverter to the second question mode gate 228 associated with the second mode line 219, the incorrect line 127 and the not correct line 121. Thus when a correct answer has been selected in this mode, a logic "0" will be applied to the opposite logic input gate 261 to establish a positive output pulse or signal. The positive going transition appearing at line 262 is directly applied to the gate to initiate the transfer signal to the "go" enable circuitry, as described in connection with FIG. 8.

In the third question mode, the system is established to provide a different response with answer A, B and C and only these three responses are presented with the question, with the operator thus actuating switch unit 5, 6 or 7. Each response is selectively related to actuate the gate 238, 239 and 240, respectively, and correspondingly selecting the first channel in response to answer A, the second channel via gate 240 in response to question B and the third channel via gate 239 in response to answer C.

The third channel selection gate 238 is connected directly via an inverter gate 263 to respond to answer A, button unit 5 by actuating the gate 238 with the device in the third question mode and answer A selected. This signal is derived by combining the third mode line 218 with answer A.

The various combinations of the third mode of operation with response to question A, B or C are provided through a set of inverter gates 264 connected respectively to answer gates 148 of the answer logic circuit of FIG. 5. Gates 264 are connected to corresponding NOR gates 265, the other input of which is connected in common to the third question mode line 218 of the mode logic circuitry. The circuit selected directly with answer A provides a direct output of the product of the answer A and the third mode at the corresponding gate 265 which is connected via line 265a to gate 263. The output of the gates 265 associated with answers B and C are respectively and similarly connected to set a pair of respective latches 266 with the output of the respective latches provides a corresponding set of signals related to the third question mode and answer B at the one latch and a summation of the third question mode and the answer C at the output of the other latch. These two outputs are in turn combined by a NOR gate 267 to provide an output signal related to the opposite or negative of the third question mode and selection of answer B or the selection of answer C.

Similarly the answer C latch is connected to actuate a latch 268, the output of which is connected as an input to the gate 239. If answer C is selected the latch 268 will be set to establish a proper signal to the gate 239 to drive selection channel 3 to a logic "0" thereby enabling the third channel. The operation of this gate is restricted to the third question mode by interconnecting the third input of the NOR gate 239 to the line 218 of the mode selection unit.

The several audio stop beep signals are applied via a common channel and particularly appear at line 248. In the mode described, the signal resets the latch 235 and simultaneously resets the latch circuit 268 thereby simultaneously terminating the running of the tape and the removal of the mode selection for channel three. Similarly, the second tape channel is selected via the gate 240 through the gate 256, the second input of which is connected to a combination signal line of latch 266 for answer B which is for the combination of the third mode line 218 and the answer B selection response from the answer logic unit of FIG. 5.

Figure 8:
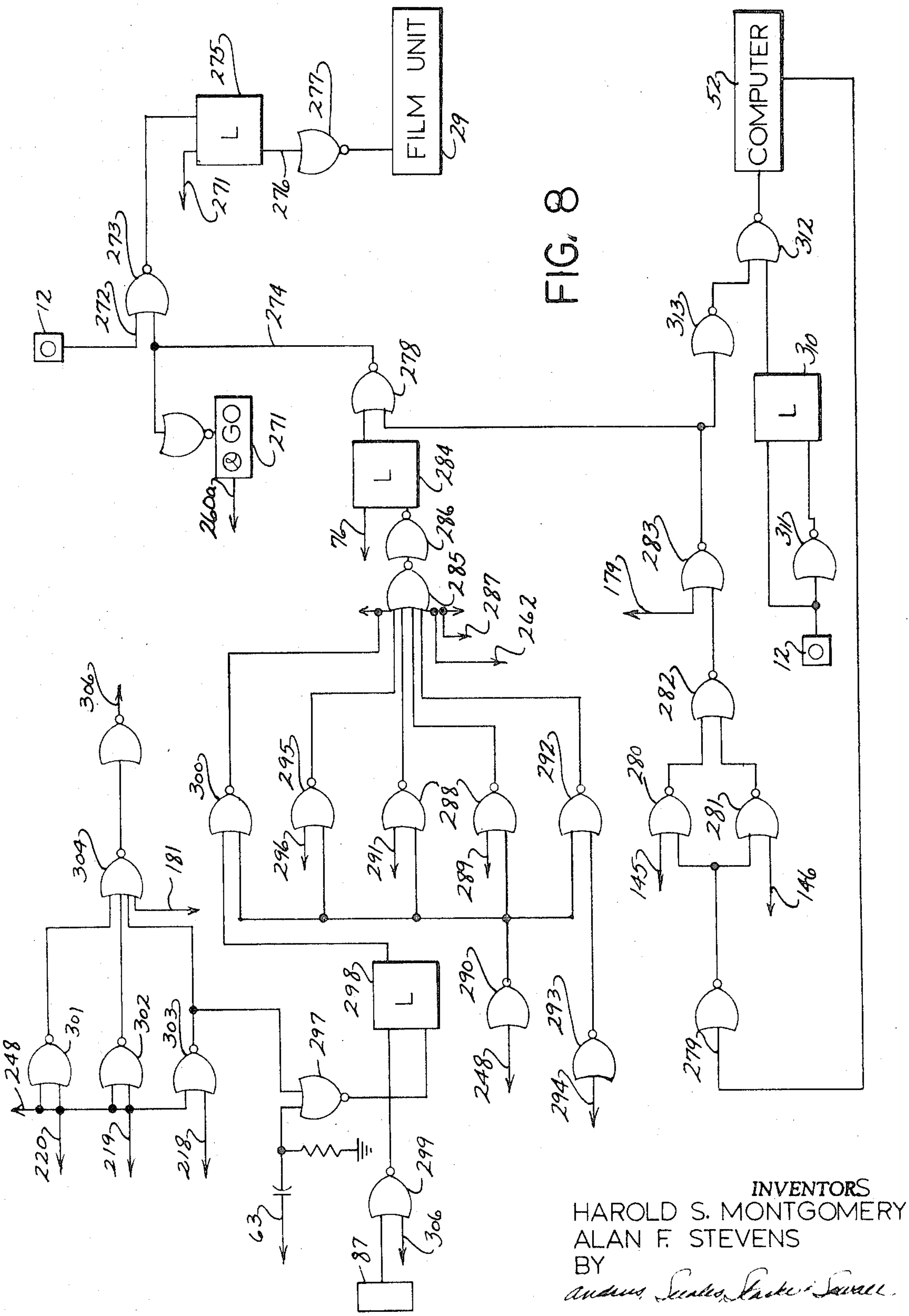
FIG. 8 is a schematic of the presentation and response enabling logic circuitry.

For the third mode, the OR gate 229 includes a final input line 269 generated by combining of the third mode with the several answers as shown in FIG. 8 and subsequently described. A logic signal is formed on selection of the third mode of operation and actuation of any one of the response selection switch buttons unit 5, 6 or 7 for response A, B or C. This input operates in the same manner as any other input to move the tape until an appropriate stop beep signal has been received from the selected channel.

The combined logic unit further establishes a correct answer logic signal for the correct answer lamp drivers appearing at 141 in FIG. 5 by combining the outputs of the several lines to actuate such lamps, as follows. An inverter gate interconnects the mode line 179 as one input to an OR gate 270 the output is connected to line 141. A gate 271 provides a second input to the gate 270. The gate 271 is connected respectively to the three NOR gates 228 to provide an input corresponding to selection of a correct answer and not an incorrect answer with either one of the three question modes provided by the signal lines 218, 219 and 220. Thus, the output of gate 270 at line 141 states logically that if the device is in the information retrieval mode or one of the three question modes and a correct answer and a not incorrect answer has been selected, a logic signal will be supplied to the line 141 to enable the several correct answer lamp drivers to latch the correct lamp in an on condition and maintain illumination until the lamp device is actuated to move to a subsequent frame. The output NOR gates 228 are also summated in a NOR gate 270a to generate a pulse signal at an output line in response to the logic output related to selection of one of the question modes as established by one of the lines 218, 219 and/or 220 in combination with a not correct answer and an incorrect answer. The output is differentiated to ground to provide a positive related pulsed output for controlling the combination of logic provided by the assembly in response to an incorrect response and particularly as generating the signal at line 134 of FIG. 5 to reset the latches 112 and the incorrect lamps 138.

FIG. 8, "Go" Enable and Film Advanced

The output of the combination logic circuitry and the answer logic circuitry is interconnected to control the film advance for example as shown in FIG. 8. Under normal circumstances, the film will be advanced for a single frame in response to each selection and subsequent actuation of the "go" button, except when in the branch or home mode at which time a signal is established to continuously advance the film until the film stop code is inserted in the register 31 or the home bit is set.

Referring particularly to FIG. 8, the film is advanced in response to selective actuation of the "go" button unit 12 which is selectively enabled after presentation of a film frame. A lamp 271 is illuminated when the "go" button is in condition to present a subsequent frame. The energization for the film drive is through a set of normally open contacts to the inverted output of the "go" button. Thus when the "go" button is actuated a logic "0" signal is established at one input line 272 to a two input NOR gate 273. The opposite input line 274 of the gate is connected to a "go" enable circuitry in common with the connection to the "go" lamp 271. If the input control line 274 is also in a logic "0" state the output of the gate will go to a logic "1." The output of the gate 273 is differentiated through a capacitor-resistor network and applied as a positive pulse to the input to a latch circuit 275. The latch circuit is originally reset through the receipt of a signal from the interlock line 71 when the film stops moving. The output of the latch circuit establishes a positive signal at the output line 276 resulting in a corresponding input to a NOR gate 277 for energizing of the film drive. Thus a signal film advance is obtained when the system is ready to advance the film by establishing of a logic "0" signal at the enable line 274.

The logic "0" is established through a NOR gate 275 having a first input to respond to the circuit in the information retrieval mode and a second input responding to the device in a question mode.

The information retrieval mode is established through the following circuit.

As previously noted, in the information retrieval mode, the computer 52 is to accept the selected answer and the identifying frame number in track register 32. The computer 52 establishes a signal when it is available as a logic "1" signal at a line 279 in FIG. 8. The signal is inverted to a logic "0" signal and connected to a corresponding input to a pair of gates 280 and 281. It may also provide an illumination of a system ready lamp, not shown. The gate 280 sums the system ready signal with the signal indicating selection of answer A, B or C through the interconnection of the second input to the line 145 of the answer logic circuit of FIG. 5. Similarly, gate 281 summates a system ready signal with the selection of answers D or E by interconnection of the second input to the logic signal line 147 of FIG. 5. Thus depending upon a selection of an answer but requiring the selection of an answer under this mode of operation, one or the other of the gates will be presented with a pair of logic " 0" signals and thereby generate a logic "1" output signal to a summing NOR gate 282, the output of which is connected to combine the any answer selection and system ready with the mode control in a NOR gate 283. The second input of the gate is connected to the not logic signal for the information retrieval mode and particularly line 179 of the mode selection circuit shown in FIG. 6. Thus, when the mode is selected the logic signal or the line 179 will go to a logic "0" providing a pair of logic "0" signals to the gate 283 the output of which then goes to a logic "1" which applied to the gate 275 with the result of which is a run signal to the film advance from gate 277, as previously described. The film then advances a single frame. Under the branch mode, the film continues to run until the branch logic circuit produces a stop code and again establishes the mode decoder 43 and the like as described with respect to FIG. 6.

The alternate method of enabling the gate 275 and thus the "go" button response is through all other operating modes including the question, the external and the exposition modes. Generally the second input to the gate 275 is derived from a latch 284 which is initially set to establish a logic "0" signal to the gate 275 as a result of the interconnection to the not condition frame detecting logic input and particularly line 76 of the circuit shown in FIG. 4. A positive input signal at the set input sets the latch 284 and establishes a logic "1" output. The control input to the latch 284 is derived from multiple input NOR gate 285 in series with an inverter 286. The gate 285 provides summing input for the several modes of operation. The filler mode provides an input connected directly to the mode selection circuitry of FIG. 6 which will activate the system and immediately enable the "go" button for sequential presentation of subsequent frames. In addition the external mode and the exposition mode are interconnected to actuate the film advance through similar NOR gates 288, thus the exposition mode input is connected to the associated logic line 289 and the gate 288 for the external mode is connected to the input but not external input mode 290, such that selection of such mode of operation generates a positive input signal to the respective NOR gates 288 which in turn generates a positive input to the gate 285, the film then advances a single frame with each actuation of the "go" button with the gates being reset by the insertion of a new frame of information with the resetting of the latch 284 via line 76.

In these modes and the question modes, the film drive is latched against movement until a tape stop signal is generated indicating termination of the audio unit operation.

For example when the tape apparatus is enabled it will establish a first movement and then create the stop signal which is applied via an inverter 290 to the second input of the several gates 288. When that occurs the gate 288 will establish a positive going pulse. The positive going pulse thus established sets the latch circuit 284 and enable the "go" button in the same manner as in the information retrieval mode.

Similarly, when the mode decoder 43 has established the first question mode requiring selection of the correct answer the audio stop gate 290 is also connected to one of the control gates 292 the other input of which is connected through an inverter 293. The latter provides an input signal when the first question mode is selected in combination with a correction answer and a not incorrect answer. It will be recalled that in this mode, the tape unit 30 is actuated to provide a message. When the stop beep occurs, the gate 292 will establish a positive going pulse to enable the "go" buttons in the same manner as that described with respect to the exposition code.

Similarly a gate 295 is connected to respond to the second mode of operation in combination with the selection of a correct answer and a not incorrect answer through the interconnection of a gate. The gate 295 has a one input connected via lead 296 of FIG. 7 from the NOR gate 228 associated with the second mode of operation selection of a correct answer and a not incorrect answer.

In the third mode of operation where answers A, B and C are selected to provide separate control, a NOR gate 297 with one input interconnected via the lead to the not logic lead 218 of the mode detector 43 (FIG. 4) and the other to the not answer A. B and C logic lead 145 of the answer logic circuit of FIG. 5. If the device is set in the third mode and an answer A, B or C is selected the gate 297 establishes an output signal which is differentiated to set a latch 298.

The latch 298 is initially reset through the usual reset circuitry applied to OR gate 299. The output of latch 298 is normally a logic "1" which is set to a logic "0" only when it is in the third mode of operation and answer A, B or C has been selected. The output of the logic circuit is applied as one input to NOR circuit 300, the opposite input of which is again coupled to the tape stop gate 290. As previously noted the apparatus is selected to provide a message from channel 1, 2 or 3 in accordance with the selection of response A, B or C in the third mode of operation. Thus upon the selection of an answer the system operates to present the message. This also conditions gate 300 for transmitting a stop signal upon receipt of the stop beep signal via the gate 290. The output of the gate 300 is applied to the gate 285 and functions in the same manner as the outputs of the other gates 292 and 295 to condition the "go" button circuitry for presenting a subsequent frame. The latch 298 is reset via a second input to the OR gate 299 which is derived from the answer enable input circuitry shown in FIG. 8. The three not question mode lines for the three question modes of the mode decoder 218, 219 and 220 are connected to corresponding NOR gates 301, 302 and 303. The second inputs of which are connected in common to the tape stop signal line 248. The gate 303 provides a reset signal to latch 298 via the lead 304 upon receipt of the stop signal. Lead 304 is also connected to reset the latch 266 of the third mode answer sensing circuit shown in FIG. 7.

The outputs of gates 301 – 303 are connected to four input NOR gate 305, having the information collecting mode line 181 as its four input. The output is inverted and connected via the lead 306 to the answer enabling latch 109 shown in FIG. 5.

The information carried by the data track 19 thus controls the subsequent operation of the film drive and the audio tape unit.

As previously noted the information carried on data track 20 identifies the particular frame number this information along with the selected answer is transferred to the computer 52. The data register 32 for recording the identifying frame number is essentially similar to that previously described for the first track and consequently no further description of the shift register is given.

As previously noted, the logic system does require the computer system ready as well as actuation of the "go" push button unit 12 to establish transfer. A logic providing such a system is briefly shown in FIG. 8, wherein the "go" button unit 12 is coupled to a set input of a latch 310 and to the reset input of a latch 310 through an inverter 311. The output of the latch is supplied to a two input NOR gate 312 the opposite input of which is connected to the system ready and the retrieval mode input line 313. When zeros appear at the two input of the NOR gate 312 a signal is transmitted to the computer 52 to transfer the information to the computer. Upon actuation of the "go" button, the system will automatically transfer the information to the computer to record the information therein including the identifying number, the machine unit coupled thereto and the response recorded by such machine at that given time. In this manner the program presented and the responses are maintained in the computer to be automatically read out as required subsequently. Further a plurality of the information retrieval devices can be incorporated as a single input to a computer.

The present invention thus provides a multiple mode response device where the presentation carrier means and code carrier means are synchronized to completely control the operation and function of the device by determining the sequence of the presentation of the visual frame, the selection of one or more audio branching or signals to produce desired reinforcement in connection with the response and the like. The invention has been particularly described with particular modes of operation and has been assumed that the several modes operated generally in a sequential manner. The modes can be intermixed to produce the desired result. Thus even through the apparatus is set basically as an information retrieval device in order to obtain and record information regarding the operation or the like. If desired any other mode may be intermixed during the retrieval sequence in order to maintain optimum results. As previously noted the preferred apparatus shown and presenting the information in a sequential manner substantially minimizes the associated expense with the apparatus while maintaining reliable and positive information for controlling the apparatus. Thus, in a relatively limited code area all instructions are provided including the mode of operation, the selection of the information regarding correct and incorrect answers, interrelated branch destination and addressing as well as specific identification of the particular frame in answer selection for separate recording. In addition external equipment can of course be controlled in a very simple and reliable manner. Thus in the illustrated embodiment of the invention notwithstanding the substantial versatility of the embodiment of the invention and the various combinations less than half the total mode capability of the other system has been employed, thus permitting a great number of other modes to be incorporated into the operational system if so desired.

As previously noted the present invention is particularly adapted for use with a shutterless camera to provide continuous transfer of the data information into the shift registers. If desired, of course, a special shutterless camera can be employed to cover only the information area while maintaining the code area exposed. However, Applicant has found that the rapid movement of the film is such as to permit the convenient and practical application of a shutterless camera and thus minimize the expense and cost of the apparatus.

Various modes of carrying out the invention are contemplated as being within the scope of the following claims, particularly pointing out and distinctly claiming the subject matter which is regarded as the invention.

We claim:

1. An information transmitting apparatus having presentation means for presenting interrelated stimulus information in sequences and receiving one of a plurality of corresponding information responses by actuation of a selective responsive means comprising, carrier means carrying said stimulus information in a series of individual information frames sequentially moved into presentation position in said presentation means and individual code frames corresponding to said information frames and means for moving said frames in synchronism, each of said code frames including at least one data track having a plurality of sequential control code areas arrayed in the direction of the movement of the code frames, a single code reader element mounted in the path of said track and reading said code areas in sequence as the code frame traverses the reader means, storage means to store said coded information, and processing means coupled to the code reader means said carrier means including a film strip having said information frames located generally centrally of the strip with said code frame adjacent to the corresponding frame, a projector means receiving said film strip for presenting the information frame with the film strip in preselected position within said projector means, said data track having the code areas longitudinally arranged of the film strip in the form of light transmission and light opaque code areas, said projector means being a shutterless projector for continuously transmitting the stimulus and the code information.

2. An information transmitting apparatus having presentation means for presenting sequential interrelated stimulus information and receiving one of a plurality of corresponding information responses by actuation of a selective response means, carrier means carrying said stimulus information in a series of individual information frames sequentially moved into presentation position and individual code frames corresponding to said information frames and means for moving said frames in synchronism, each of said code frames including frame and locating code area means and at least one data track including sequential control code areas arranged in the direction of the movement of the code frames and defining coded information, a code reader means to read said code areas in sequence as the code frame traverses the reader means, a register means coupled to the code reader means to serially receive said coded information, and information processing means coupled to said register and to said response means, and interlock sensor means coupled to said carrier means and responsive to said frame location code areas to selectively activate the processing means and permit subsequent movement of said carrier means.

3. The information transmitting apparatus of claim 2 wherein said coded areas include a home area encoded on one frame and having a home switch means operable to actuate said carrier means to move to a home position in accordance with the coding of said home area.

4. The information transmitting apparatus of claim 2 wherein said coded information includes coded areas identifying each frame, and said register means receiving said frame identification and the corresponding response, and computer means to selectively receive said information.

5. The transmitting apparatus of claim 2 wherein said carrier means is a film strip having said information frames located centrally of the strip with said code frame adjacent to the corresponding frame, said data track having the code areas longitudinally arranged of the film strip in form of light transmission and light opaque code areas, a shutterless film projector associated with said film strip for continuously transmitting the stimulus and the code information as the film strip moves relative to the code reader, and said interlock sensor means being electronically interlocked to said processing means to disable said processing means during the movement of the film strip.

6. The information transmitting apparatus of claim 2 wherein said film strip is moved in a stepped manner to sequentially present said film frames, and branch means coded on said individual frames for selectively advancing said film strips for a plurality of frames in accordance with a mode code and a frame address code on a given code frame.

7. The information transmitting apparatus of claim 2 wherein said carrier means is a film strip having a plurality of sequentially presented visual display information frames arranged longitudinally of the film strip, each frame having a code portion immediately adjacent each frame, said interlock code area means including spaced code areas defining said sensor means including a plurality of individual light sensitive sensing elements one for each of said spaced code areas, a logic circuit means coupled to said individual sensing elements to generate a first signal with the code areas aligned with the plurality of sensing means and a different second signal with any one of the code areas spaced from a sensing element, and means connecting said logic circuit means to selectively enable said information processing means.

8. The apparatus of claim 7 wherein said signals are different voltage levels defining a binary logic, and having means to differentiate each change from one signal to another and thereby generate pulse latching signals and continuous latching signals for controlling said processing means.

9. The information transmitting apparatus of claim 2 wherein said carrier means is a film strip having a series of adjacent individual information frames sequentially and longitudinally movable into a presentation position, a shutterless projector for receiving said film and moving said film by frame steps, said frame locating code areas including a pair of longitudinally spaced transparent areas along one edge of the information frame and said data track having said sequential control code areas located along the opposite edge of said information, said register means being a clock activated serial shift register having a memory element for each data bit in said data track, said film strip having a clock track located adjacent and parallel to said data track and having alternate opposite binary code areas, one for each code area of the data track, said code reader means including a light sensitive element aligned with said data track and a light sensitive element aligned with said clock track to read said code areas in sequence as the film strip moves.

10. The information transmitting apparatus of claim 9 wherein said data track leads said clock track by a portion of a code area in traversing said light sensitive elements.

11. The transmitting apparatus of claim 2 wherein said carrier means is a film strip having said information frames located generally centrally of the strip with said code frame adjacent to the corresponding information frame, said data track having the code areas longitudinally arranged of the film strip in the form of light transmission and light opaque code areas, said film strip including a clock track longitudinally arranged in the form of alternating light transmission and opaque areas with one clock area for each code area, said register means being a shift register having a memory unit for each code area and having clock input means to each memory unit, said code reader having individual light sensitive means coupled to said clock track and said clock input means, said interlock means including a plurality of spaced code interlock areas correspondingly spaced on said film strip on each of said code frames, and a corresponding plurality of interlock sensors arranged in accordance with said interlock areas with said data track code information set in said shift register.

12. The information transmitting apparatus of claim 11 wherein said processing means includes an answer logic comparator connected to the response means and the code reader means provides for a plurality of answer logic output signals including a correct output signal and a not correct output signal and an incorrect output signal and a not incorrect output signal, said processing means including a mode decoder connected to the code reader means and establishing a series of different outputs for selectively responding to different individual and combinations of said answer logic output signals, said mode decoder establishing at least one information collecting mode wherein the selected answer is selectively transferred into said storage means, said data track means including unique frame identifying code means, said code reader means being selectively coupled to said storage means to transfer said identifying code means to said storage means with the selected answer.

13. The information transmitting apparatus of claim 11 wherein said processing means includes an answer logic comparator connected to the response means and the code reader means provide for answer logic output signals defined as correct output and not correct output and incorrect output and not incorrect output said processing means including a mode decoder connected to the code reader means and establishing a series of different outputs for selectively responding to different individual and combinations of said answer output signals, a signal storage means, said mode decoder establishing at least one information collecting mode wherein the selected answer is selectively transferred into said storage means, said data track means including unique frame identifying code means, said code reader means being selectively coupled to said storage means to transfer said identifying code means to said storage means with the selected answer, said processing means including a start means for actuating said film strip drive including a logic means coupled to said answer logic comparator and to said mode decoder and to said storage means to selectively enable said start means only in response to a selected operation of the response means.

14. The information transmitting apparatus of claim 2 wherein said stimulus information is simultaneously presented with a plurality of responses, said code frames each including a code identifying address code for each frame related to a stop frame code of a subsequent frame and including a coded selection of at least one of said responses to actuate said apparatus to transport said film from the presented frame to the corresponding frame with the stop frame code.

15. The information transmitting apparatus of claim 14 wherein said code frames include mode determining code areas and transfer means responsive to said mode determining code areas to selectively introduce said address code into said processing means, and continuous advance means responsive to introduction of said address code to actuate the carrier means to continuously advance said film frames until the stop frame code corresponds to the address code introduced into the progressing means.

16. The information transmitting apparatus of claim 14 wherein said transfer means includes a storage means for receiving said address code and a comparator means for reading each stop frame code of a subsequent frame and comparing the stop frame code with the storage means, logic means connected to said code reader and to said response means and to said transfer means to transfer the code into the storage means in response to selected operation of the response means and the coded mode of operation.

17. The transmitting apparatus of claim 16 wherein said storage means are resettable, and said comparator means being connected to rest the storage means.

18. The information transmitting apparatus of claim 2 wherein said carrier means is a film strip having longitudinally spaced stimulus frames with integral laterally spaced and longitudinally aligned code frames, said data track being longitudinally extended to one side of the stimulus frame and each data track including a plurality of equally shaped immediately adjacent binary coded areas, said code reader including a register to serially receive the binary coded bits, said coded areas and said register being divided into a plurality of code bit groups with each group including a plurality of code areas defining related coded register banks, said groups including a selected answer bank to differentiate at least one of the responses from the other responses and a mode bank to establish selective actuation in response to the different actuation of the response means, said groups further including a frame address bank and a stop bank related to the frame address group of a different frame, said processing means including an answer logic unit connected to the answer bank and to the response means and establishing a plurality of outputs in accordance with the selected response and the answer code bits, a mode decoder connected to the mode bank and establishing a question and answer mode including correct and incorrect answer response and an information collecting mode in which all response are correct, a branch logic unit connected to said address bank and said stop bank for selectively comparing said corresponding coded bits for advancing said film strip from one frame to preselected different frame, and a combine logic unit connected to said answer logic unit and said mode decoder to combine the respective outputs and connected to said branch logic unit to selectively actuate said branch logic unit.

19. The information transmitting apparatus of claim 18 wherein said answer bank having one two output code memory for each answer whereby each answer is coded correct and incorrect, said answer logic unit including comparator means coupled to the correct and incorrect outputs of each register and to the answer selective response means to compare the selected answer with the coded answers and to provide a correct output and a not correct output and an incorrect output and a not incorrect output, said operational information collecting mode processing all answers as a correct answer and selectively presenting different film frames in accordance with the output of said comparator means.

20. The information transmitting apparatus of claim 19 having an incorrect output indicator and a correct output indicator, and answer operating logic means connected to said answer logic unit and to said combine logic unit to selectively actuate said output indicators.

21. The information transmitting apparatus of claim 20 wherein said response means includes a different input element for each response, said mode bank establishes a question mode with correct and incorrect responses and said combine logic unit is connected with the correct indicator actuated and latched in response to a correct answer selection and said correct indicator actuated only during the period the corresponding input element is actuated, said mode bank establishing an information 1 mode wherein all answers are correct and said combine logic unit connected prevents operation of the incorrect indicator and actuates the correct answer indicator for all permitted actuation of said input elements.

22. The information transmitting apparatus of claim 21 having an operator actuated start means for energizing said presentation means, enabling means coupled to response means and operative only in response to selected operation of said response means to enable said start means, second enabling means coupled to start means and to said processing means and responsive to said interlock sensor means and said code reader means to enable said response means, a clear means operable to reset said indicators, and said combine logic unit connecting said mode decoder to said clear means to restrict operation of said clear means to said information collecting mode.

23. The information transmitting apparatus of claim 22 wherein said mode decoder includes an additional question mode with a single correct answer, and said combine logic unit establishing a first mode activating said enabling means in response to any response and a second mode activating said enabling means upon selection of the correct response.

24. The information transmitting apparatus of claim 18 including an audio reinforcing means, start means for said initiating operation of said audio reinforcing means, said combine logic unit having reinforcing code outputs to activate said reinforcing means in accordance with selected combination of said responses and said modes, said reinforcing means generating control signals for selectively actuating said presentation means to maintain precise synchronous operation of said carrier means and said audio reinforcing means.

25. The information transmitting apparatus of claim 24 wherein said audio reinforcing means is a multiple channel tape unit, and combine logic unit has channel selection means selectively responsive to the coded incorrect and correct of the response means and selectively responsive to a particular response of the response means.

26. The information transmitting apparatus of claim 2 wherein said presentation means including a visual display means for presenting said stimulus information, said apparatus including an audio reinforcing means, start means for said initiating operation of said audio reinforcing means, said carrier means having reinforcing code information and said register having an output coupled to actuate said reinforcing means in accordance with said reinforcing code information, said reinforcing means generating control signals for selectively actuating said presentation means.

27. The information transmitting apparatus of claim 2 wherein said carrier means is a film strip having longitudinally spaced information frames with integral laterally spaced and longitudinally aligned code frames, said code areas being selectively light transparent and opaque to provide a binary signal, said frame location code area being a pair of spaced corresponding areas along one side edge of each stimulus frame, said data track being longitudinally extended to opposite sides of the stimulus frame and each data track including a plurality of equally shaped immediately adjacent coded areas.

28. The information transmitting apparatus of claim 2 wherein said coded areas are divided into a plurality of code bit groups with each group including a plurality of code areas, said groups including a selected answer group to differentiate at least one of the responses from the other responses and a mode group to establish selective actuation in response to the different actuation of the response means, said groups further including a frame address group and a stop group related to the frame address group of a different frame, and said mode group including at least one operational information collecting mode establishing selective functional operation of said processing means including said address and stop groups.

29. The information transmitting apparatus of claim 2 wherein said carrier means is a film strip having longitudinally spaced stimulus frames with integral laterally spaced and longitudinally aligned code frames, said code areas being selectively light transparent and opaque to provide a binary signal, said frame location code area being a pair of spaced corresponding areas along one side edge of each stimulus frame, said data track being longitudinally extended to opposite sides of the stimulus frame and each data track including a plurality of equally shaped immediately adjacent coded areas, said coded areas being divided into a plurality of code bit groups with each group including a plurality of code areas, said groups including a selected answer group to differentiate at least one of the responses from the other responses and a mode group to establish selective outputs in response to the different actuation of the response means, said groups further including a frame address group and a stop group related to the frame address group of a different frame, said mode group including at least one operational information collecting mode establishing elective functional operation including said address and stop groups.

30. The information transmitting apparatus of claim 29 wherein said register means is a shift register having a memory unit for each data bit and each having a clock input, said code frames each carrying a clock track coupled to clock input in said processing means including a matrix decoder having first and second line groups connected to the correct and incorrect output of each shift register memory corresponding to the mode group.

31. The information transmitting apparatus of claim 30 wherein said selected answer group includes a single side of said selected answers, said answer group having one code bit for each answer whereby each answer is coded correct and incorrect, said processing means including comparator means coupled to the correct and incorrect outputs of each shift register and to the answer selective response means to compare the selected answer with the coded answers and to provide a correct output and a not correct output and an incorrect output and a not incorrect output, said operational information collecting mode processing all answers as a correct answer and selectively presenting different film frames in accordance with the output of said comparator means.

32. The information transmitting apparatus of claim 2 having an operator actuated start means for energizing said presentation means, said processing means including enabling means coupled to said response means and operative only in response to selected operation of said response means in accordance with the coded information in said data track to enable said start means, and second enabling means coupled to start means and to said processing means and responsive to said interlock sensor means and said code reader means to enable said response means.

33. The information transmitting apparatus of claim 2 wherein said data track includes a plurality of adjacent binary code areas defining a mode control input, and said processing means including a mode decoder connected to the code reader means and establishing a series of different outputs in accordance with different binary combinations of said code areas for selectively responding to different individual and combination actuations of said response means.

34. The information transmitting apparatus of claim 33 having a signal storage means, and said mode decoder establishing at least one information collecting mode wherein the selected answer is selectively transferred into said storage means, said data track means including unique frame identifying code means, said code reader means being selectively coupled to said storage means to transfer said identifying code means to said storage means with the selected answer.

35. The information transmitting apparatus of claim 33 wherein said code reader includes a register element for each code area, said mode decoder is a matrix having first input lines connected to the register elements for first selected mode coded areas and second input lines connected to register elements for second selected mode coded areas, logic gate elements connected to selected pairs of the first and second input lines, and output means, logic means connecting said response means to said output means and connected to gate elements to control the actuation of the output means in accordance with the actuation of said gate elements.

36. The information transmitting apparatus of claim 2 wherein said carrier means is a film strip having longitudinally spaced stimulus frames with integral laterally spaced and longitudinally aligned code frames, each of said frames including three of said data tracks longitudinally extended to one side of the stimulus frame and each data track including a plurality of equally shaped immediately adjacent binary coded areas with one of said data tracks including alternately transparent and opaque code areas to define a clock pulse source and second and third tracks including grouped information code areas, said code reader including a separate register to serially receive the binary coded bits from the second and third data tracks, said coded areas and said corresponding registers being divided into a plurality of code bit groups with each group including a plurality of code areas and related coded register banks, said groups including a selected answer bank to differentiate at least one of the responses from the other responses and a mode bank to establish selective actuation in response to the different actuation of the response means, said groups further including a frame address bank and a stop bank related to the frame address group of a different frame, said groups further including a unique frame identification bank number for each frame, an information storage means connected to the register bank connected to said identification bank, said processing means including an answer logic unit connected to the answer bank and to the response means and establishing a plurality of outputs in accordance with the selected response and the answer code bits, said answer logic unit being connected to said information storage means, a mode decoder connected to the mode bank and establishing a question and answer mode including correct and incorrect answer response and an information collecting mode in which all responses are correct, a branch logic unit connected to said address bank and said stop bank for selectively comparing said corresponding coded bits for advancing said film strip from one frame to preselected different frame, and a combine logic unit connected to said answer unit and said mode decoder to combine the respective outputs and connected to said branch logic unit to selectively actuate said branch logic unit, said combine logic unit including means responsive to establishment of said information collecting mode to transfer the selected answer and the frame identification into said storage means.

37. The information transmitting apparatus of claim 36 having an operator actuated start switch for energizing said presentation means, enabling means coupled to said response means and selectively operative in response to any selected operation of said response means to enable said start means, a clear means operable to reset said response means, and said logic unit connecting said mode decoder to said clear means to restrict operation of said clear means to said information collecting mode.

* * * * *

UNITED STATES PATENT OFFICE
CERTIFICATE OF CORRECTION

Patent No. 3,733,717 Dated May 22, 1973

Inventor(s) Harold S. Montgomery et al.

It is certified that error appears in the above-identified patent and that said Letters Patent are hereby corrected as shown below:

Column 17, line 15, "formation" should read -- information --. Column 31, line 25, at the end of the line insert -- and to response means to provide an output related to preselected correlation between said coded information and the actuation of said response means, --; line 37, after "information" cancel the "period (.)" and insert -- , each of said code frames including a plurality of spaced code interlock areas, and interlock sensor means spaced in accordance with said interlock areas and being electronically interlocked to said processing means to disable said processing means during the movement of the film strip and to enable said processing means with an information frame aligned within said presentation means. --.

Signed and sealed this 26th day of March 1974.

(SEAL)
Attest:

EDWARD M.FLETCHER,JR.
Attesting Officer

C. MARSHALL DANN
Commissioner of Patents